(12) United States Patent
Wilson et al.

(10) Patent No.: US 11,535,068 B2
(45) Date of Patent: Dec. 27, 2022

(54) LOAD-BASED TIRE INFLATION SYSTEM FOR HEAVY-DUTY VEHICLES

(71) Applicant: Hendrickson USA, L.L.C., Schaumburg, IL (US)

(72) Inventors: Matt J. Wilson, Canal Fulton, OH (US); Jesse W. Cervantez, Navarre, OH (US); Jeff R. Zawacki, Channahon, IL (US)

(73) Assignee: Hendrickson USA, L.L.C., Schaumburg, IL (US)

( * ) Notice: Subject to any disclaimer, the term of this patent is extended or adjusted under 35 U.S.C. 154(b) by 451 days.

(21) Appl. No.: 16/006,982

(22) Filed: Jun. 13, 2018

(65) Prior Publication Data

US 2018/0312018 A1 Nov. 1, 2018

Related U.S. Application Data

(60) Provisional application No. 62/491,319, filed on Apr. 28, 2017.

(51) Int. Cl.
*B60C 23/00* (2006.01)
*B60G 17/04* (2006.01)
(Continued)

(52) U.S. Cl.
CPC ...... *B60C 23/00372* (2020.05); *B60C 23/002* (2013.01); *B60C 23/00336* (2020.05); *B60C 23/00354* (2020.05); *B60C 23/0408* (2013.01); *B60G 17/0155* (2013.01); *B60G 17/04* (2013.01); *B60G 17/052* (2013.01); *B60S 5/046* (2013.01); *B60C 2200/06* (2013.01); *B60G 11/27* (2013.01); *B60G 2202/152* (2013.01); *B60G 2300/026* (2013.01); *B60G 2300/042* (2013.01); *B60G 2400/252* (2013.01); *B60G 2400/30* (2013.01); *B60G 2400/51222* (2013.01); *B60G 2400/52* (2013.01); *B60G 2400/60* (2013.01); *B60G 2800/984* (2013.01)

(58) Field of Classification Search
None
See application file for complete search history.

(56) References Cited

U.S. PATENT DOCUMENTS

| | | |
|---|---|---|
| 4,763,709 A | 8/1988 | Scholer |
| 5,516,379 A | 5/1996 | Schulz |
| (Continued) | | |

FOREIGN PATENT DOCUMENTS

| | | |
|---|---|---|
| EP | 2896514 A2 | 7/2015 |
| GB | 891756 | 3/1962 |

*Primary Examiner* — Lail A Kleinman
(74) *Attorney, Agent, or Firm* — Dureska & Moore, LLC; David P. Dureska; Benjamin J. Chojnacki

(57) ABSTRACT

A load-based tire inflation system for a heavy-duty vehicle comprises at least one source of fluid pressure, suspension structure of the heavy-duty vehicle, a tire and wheel assembly and a system to control fluid pressure in the tire and wheel assembly. The suspension structure is located between a frame member and an axle and has a condition indicative of a weight of the heavy-duty vehicle. The tire and wheel assembly is operatively mounted to the axle and is in fluid communication with the source of fluid pressure. The control system controls fluid pressure in the tire and wheel assembly in response to the condition of the suspension structure.

19 Claims, 11 Drawing Sheets

(51) Int. Cl.
  *B60S 5/04*        (2006.01)
  *B60G 17/052*      (2006.01)
  *B60C 23/04*       (2006.01)
  *B60G 17/015*      (2006.01)
  *B60G 11/27*       (2006.01)

(56) References Cited

U.S. PATENT DOCUMENTS

| | | |
|---|---|---|
| 7,963,307 B2 | 6/2011 | Rudolf |
| 8,136,561 B2 | 3/2012 | Sandoni |
| 9,278,587 B2 | 3/2016 | Honig |
| 9,579,937 B2 | 2/2017 | Hennig |
| 2003/0192372 A1 | 10/2003 | Claussen |
| 2007/0080514 A1* | 4/2007 | Stender ............ B60G 17/0155 280/124.157 |
| 2009/0084481 A1 | 4/2009 | Kalavitz |
| 2013/0306192 A1 | 11/2013 | Hennig |
| 2013/0343931 A1* | 12/2013 | Wilson ............ B60C 23/00372 417/437 |
| 2014/0225345 A1* | 8/2014 | May ................ B60G 11/27 280/124.157 |
| 2015/0202931 A1* | 7/2015 | Honig ............... B60C 23/001 152/416 |
| 2017/0349009 A1 | 12/2017 | Ehrlich |

* cited by examiner

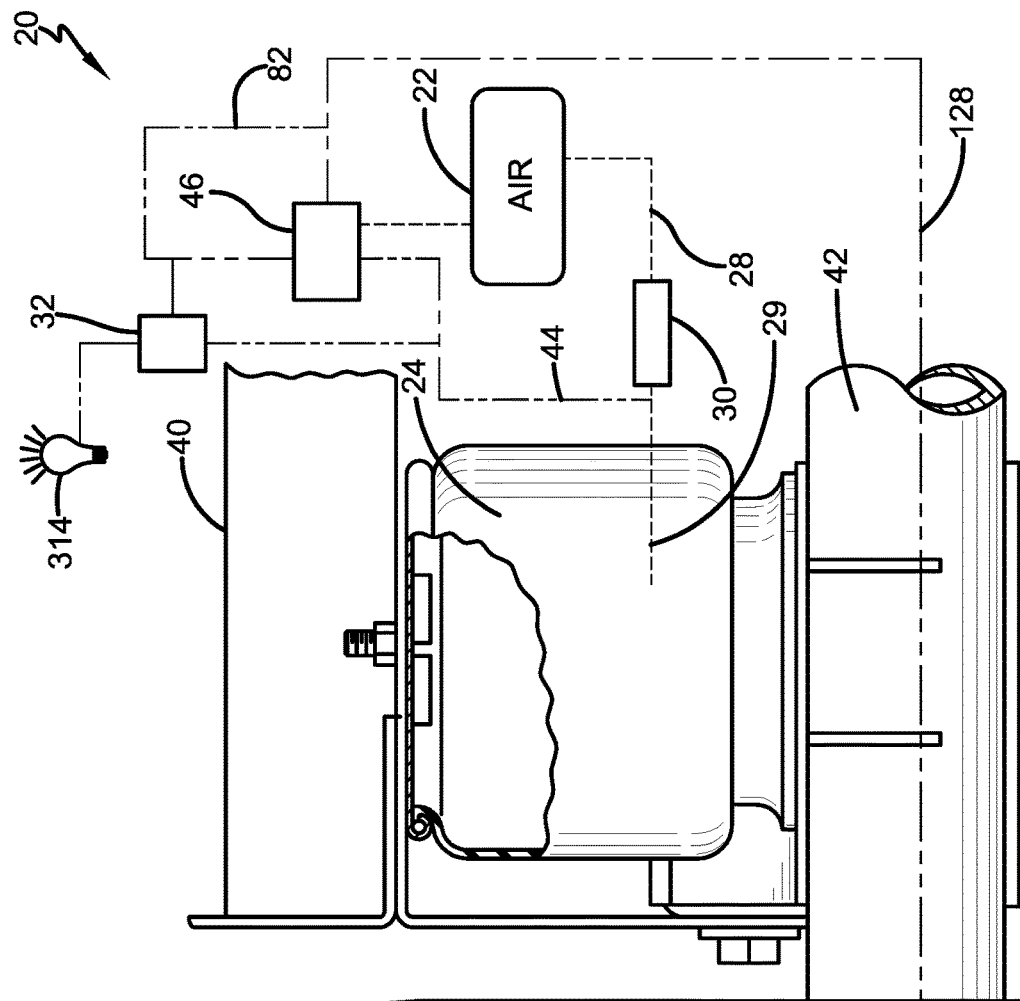
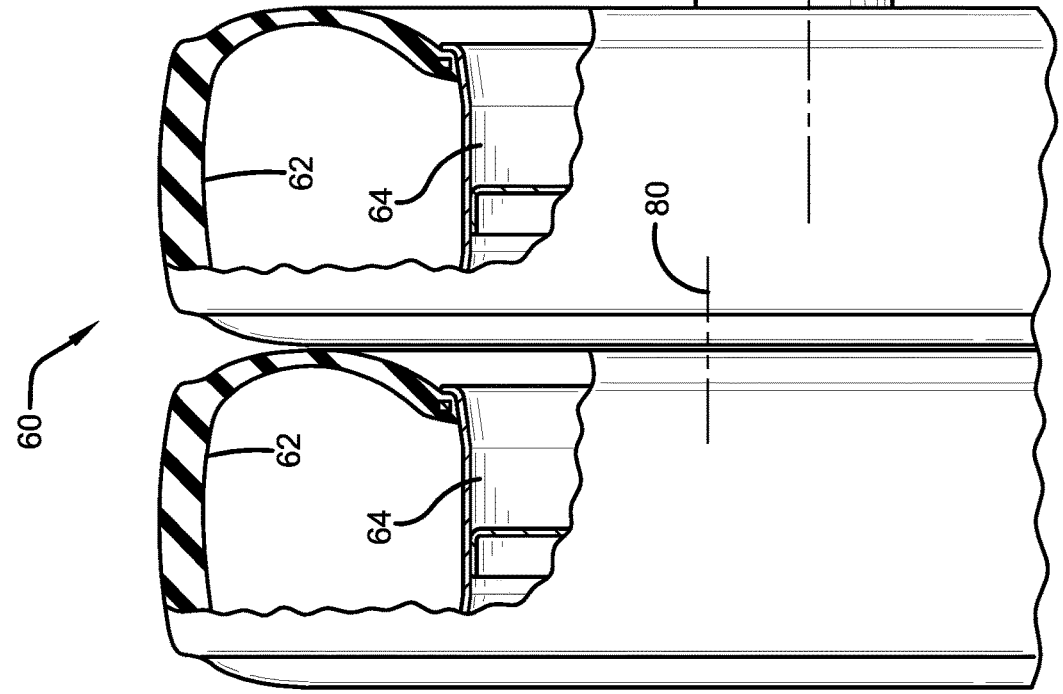
FIG. 2

LOAD-BASED TIRE INFLATION SYSTEM FOR HEAVY-DUTY VEHICLES

CROSS-REFERENCE TO RELATED APPLICATION

This application claims the benefit of U.S. Provisional Patent Application Ser. No. 62/491,319 filed Apr. 28, 2017.

BACKGROUND

Technical Field

The disclosed subject matter relates generally to vehicle tire inflation systems. The disclosed subject matter relates particularly to tire inflation systems for heavy-duty vehicles that can continuously adjust fluid pressure in vehicle tires in response to load.

Background Art

The use of tire inflation systems in heavy-duty vehicles is well known. Many heavy-duty vehicles may include at least one trailer, and sometimes two or three trailers. As used herein, the term heavy-duty vehicle generally includes trucks, tractor-trailers or semi-trailers, and trailers. Each such heavy-duty vehicle typically includes multiple tires requiring inflation with air to target pressures for optimal performance. However, it is well known that air may leak from a tire, typically in a gradual manner, but sometimes rapidly if there is a problem with the tire. Such problems may be caused by deficiencies of the tire or damage caused by a road hazard. This results in the necessity of regularly checking the air pressure in each tire to ensure that the tires are not under-inflated. If an air check shows a tire to be under-inflated, it is desirable to enable air to flow into the tire to return it to the target tire pressure.

The large number of tires on any given heavy-duty vehicle configuration makes it difficult to manually check and maintain the optimal tire pressure for each and every tire. This difficulty is compounded by the fact that heavy-duty vehicles in a fleet may be located at a site for an extended period of time, during which the tire pressure might not be checked. Any one of these heavy-duty vehicles might be placed into service at a moment's notice, leading to the possibility of operation with under-inflated tires. Such operation may increase the chance of failure of a tire as compared to tires within a target pressure inflation range. Under-inflated tires may cause excessive heat buildup within the tire causing damage to the internal structure. Under-inflation may also increase tire wear and reduce fuel economy by about 1 to 1.5% for every 10% below the target pressure.

Development of a leak or under-inflation may cause failure of the tire if the leak continues unabated as the heavy-duty vehicle travels over-the-road. Potential for tire failure is more pronounced in heavy-duty vehicles such as tractor-trailers that travel for long distances and/or extended periods of time. The Federal Motor Carrier Safety Administration's Compliance, Safety, Accountability enforcement program seeks to ensure proper tire inflation. Heavy-duty vehicles undergo inspections at weigh stations or in the field that examine tire pressures for violation. Violations may include flat tires, defined by the Commercial Vehicle Safety Alliance (CVSA) as having a pressure less than 50% of the maximum pressure indicated on or molded into the tire sidewall. Heavy-duty vehicles in violation are removed from service until repaired and may not be allowed to drive to a service center for repair or proper inflation. Thus a violation may require a roadside service call, resulting in increased expense and downtime of the heavy-duty vehicle.

Over-inflation of tires may adversely affect tire performance and service life. Over-inflation may cause tires to be more prone to puncture or damage by sudden impact, potentially causing catastrophic failure. Over-inflation typically reduces tire surface area contacting a road surface resulting in the load carried by the heavy-duty vehicle tire being distributed over a smaller area of tire tread. This may cause increased and/or irregular wear of the tire and decreased maneuverability and traction. If an air check shows a tire to be over-inflated, it is desirable to deflate the tire to return it to an optimum or target pressure.

Prior art systems have been developed to approximate and maintain the target pressure in heavy-duty vehicle tires. Prior art tire inflation systems generally inflate the tire by providing air from a vehicle air supply to the tire by using a variety of different components, arrangements, and/or methods. Prior art systems may also be capable of deflation where the system deflates the tire when the monitored pressure rises above the target pressure, by venting air from the tire and wheel assemblies to atmosphere Some prior art systems have a value for the target inflation pressure selected by an operator or pre-set within the system. Such prior art systems may allow the vehicle operator to manually adjust the value of the target inflation pressure. This allows the operator to take the vehicle load into account when making such an adjustment. Such prior art systems monitor the pressure in each tire and attempt to maintain the air pressure in each tire at or near the target pressure.

Other prior art systems use mass estimators to provide input allowing determination of correct upper and lower threshold values for tire pressure. This allows adjustment of the tire pressure upper or lower threshold values based on a calculated vehicle mass. Such prior art systems rely on electronic controls, including electronic processors, to execute relatively complex algorithms to perform calculations that estimate vehicle mass. The electronic controls generally require the use of, and may affect the operation of, the heavy-duty vehicle electrical system.

While satisfactory for their intended functions, prior art tire inflation systems are limited in certain situations. For example, the operator-set or system-preset values for the target inflation pressure of the heavy-duty vehicle tires merely include a single value for the target inflation pressure. However, due to varying weights of heavy-duty vehicle loads, many potential values for target inflation pressures exist. Manual adjustment of the target inflation pressure of known systems is also impractical or inconvenient for the vehicle operator due to the varying weight of heavy-duty vehicle loads. Electronic controls of known systems are undesirably expensive, complex, difficult to install and configure, and potentially unreliable.

Thus, it is desirable to provide an improved tire inflation system that has automatic and continuous adjustment of target inflation pressure based upon the heavy-duty vehicle load, preferably without the use of electronic components. The improved tire inflation system for heavy-duty vehicles of the disclosed subject matter satisfies these needs and overcomes the drawbacks, disadvantages, and limitations of the prior art. That is, a load-based tire inflation system of the subject disclosure continuously monitors and maintains a target tire inflation pressure, preferably without the use of electronic components.

BRIEF SUMMARY

A summary is provided to introduce concepts of the subject disclosure. The summary is not intended to identify key factors or essential features of the subject disclosure. The summary also is not intended to limit the scope of the subject disclosure.

An improved load-based tire inflation system addresses the needs and overcomes the drawbacks, limitations and disadvantages of the prior art tire inflation systems. That is, the disclosed subject matter provides a load-based tire inflation system that automatically and continuously adjusts and maintains a target inflation pressure of the tires based on heavy-duty vehicle load. Moreover, the improved load-based tire inflation system may be capable of operating without relatively expensive and potentially unreliable processors or other electronic components. The improved load-based tire inflation system is capable of detecting changes in air pressure within one or more air springs or other suspension structures as an indication of change in the heavy-duty vehicle load. Such other suspension structures may include a lift airbag in a lift axle/suspension system, a ride-height control valve, or the like. The load-based tire inflation system is also capable of detecting the inflation pressure of the heavy-duty vehicle tires. The inflation pressure can then be automatically and continuously adjusted to maintain a target pressure in response to changes in the heavy-duty vehicle load.

The improved load-based tire inflation system according to at least one aspect of the disclosed subject matter has at least one source of fluid pressure and a suspension structure of the heavy-duty vehicle. The suspension structure of the heavy-duty vehicle, such as an air spring or ride-height control valve, is located between a frame member and an axle of the heavy-duty vehicle and has a condition indicative of a load of the heavy-duty vehicle. The condition of the suspension structure is communicated to the load-based tire inflation system. The load-based tire inflation system includes a tire and wheel assembly mounted to the axle of the heavy-duty vehicle and in fluid communication with a source of fluid pressure. A fluid pressure in the tire and wheel assembly is communicated to the load-based tire inflation system. The load-based tire inflation system includes a control system to control fluid pressure in the tire and wheel assembly in response to the condition of the suspension structure that is indicative of the heavy-duty vehicle load.

The disclosed subject matter, according to another aspect, provides an improved load-based tire inflation system including at least one source of fluid pressure and at least one air spring in fluid communication with at least one source of fluid pressure. The air spring may have one or more fluid pressures that vary in response to change in a load carried by the heavy-duty vehicle. The load-based tire inflation system includes a tire and wheel assembly mounted to the axle of the heavy-duty vehicle and in fluid communication with a source of constant fluid pressure. The load-based tire inflation system includes a system capable of increasing and decreasing a fluid pressure in the tire and wheel assembly and continuously varying the fluid pressure in response to a fluid pressure in the air spring.

Another aspect of the disclosed subject matter provides a method of inflating tires of a heavy-duty vehicle with the improved load-based tire inflation system. The method may include the step of providing at least one source of constant fluid pressure. The method may include the step of locating an air spring between a frame member and the axle of the heavy-duty vehicle. The method may include the step of fluidly connecting the air spring with the source of fluid pressure. The method may include the step of the air spring positioning the frame member relative to the axle as a function of the fluid pressure. The method may include the step of detecting fluid pressure in the air spring as an indication of the heavy-duty vehicle load. The method may include the step of mounting a tire and wheel assembly to the axle. The method may include the step of fluidly connecting the tire and wheel assembly with at least one source of constant pressure. The method may include the step of detecting fluid pressure in the tire and wheel assembly. The method may include the step of controlling fluid pressure in the tire and wheel assembly in response to fluid pressure detected in the air spring.

Another aspect of the disclosed subject matter provides an improved load-based tire inflation system for a heavy-duty vehicle having an air spring located between a frame member of the heavy-duty vehicle and an axle of the heavy-duty vehicle. The air spring positions the frame member relative to the axle in response to fluid pressure in the air spring. The improved load-based tire inflation system includes a sensor for detecting fluid pressure in the air spring. The improved load-based tire inflation system includes a tire and wheel assembly operatively mounted to the axle of the heavy-duty vehicle. The improved load-based tire inflation system includes a sensor for detecting fluid pressure in the tire and wheel assembly. The improved load-based tire inflation system includes a means for establishing fluid pressure in the tire and wheel assembly based on a differential fluid pressure between the air spring and tire and wheel assembly. Establishing fluid pressure in the tire and wheel assembly may also be proportional to pressure in the air spring.

BRIEF DESCRIPTION OF THE DRAWINGS

The following description and drawings set forth certain illustrative aspects and implementations of the subject disclosure. The drawings are indicative of but a few of the various ways in which one or more aspects or implementations may be employed. Further features of the subject disclosure will become apparent from reading the following description with reference to the accompanying drawings, in which:

FIG. 2 is a fragmentary diagrammatic view, with portions broken away and in section, showing a portion of a load-based tire inflation system constructed according to another aspect.

Similar numerals refer to similar parts throughout the drawings.

DETAILED DESCRIPTION

Figure 1:
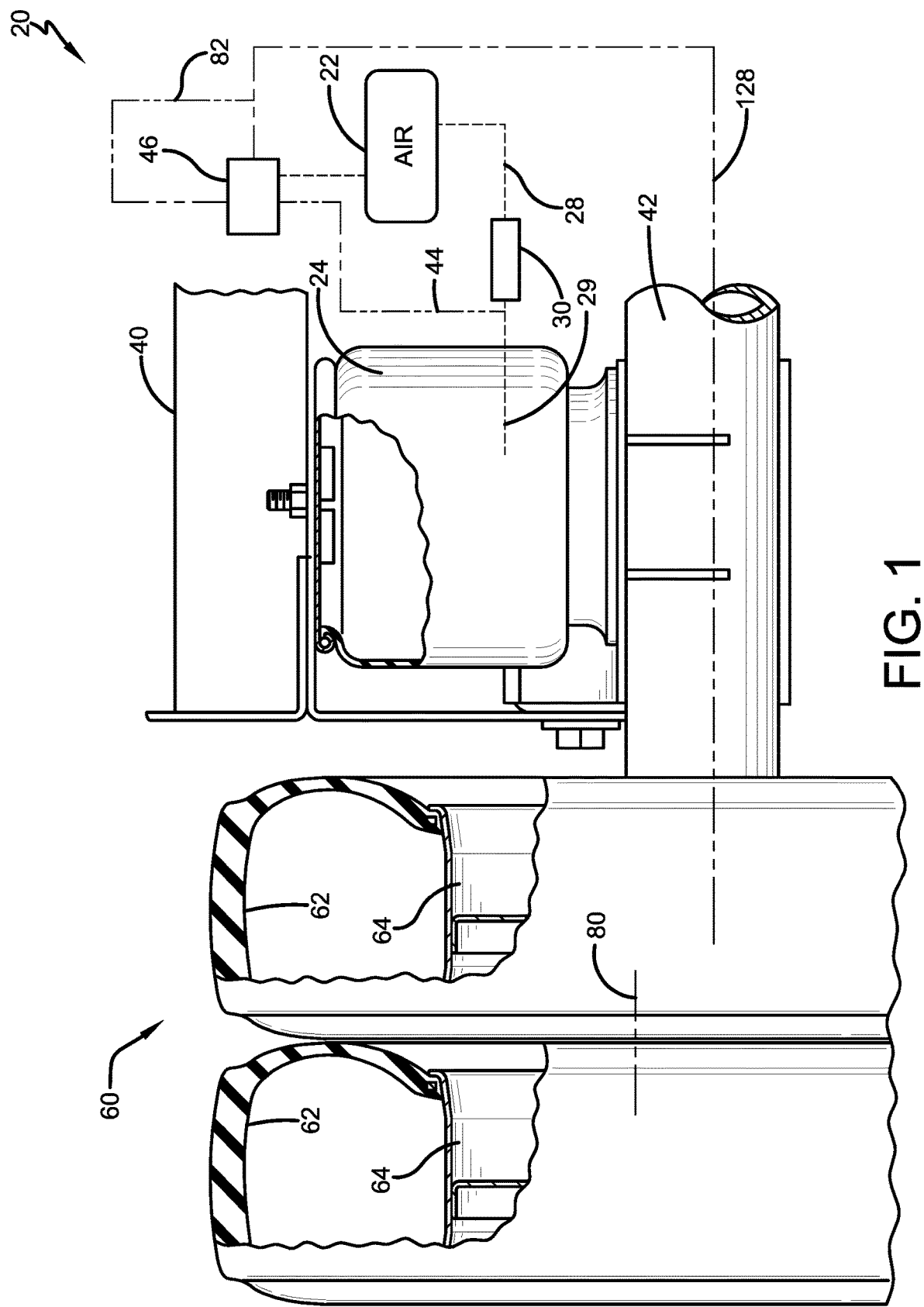
FIG. 1 is a fragmentary diagrammatic view, with portions broken away and in section, showing a portion of a load-based tire inflation system constructed according to one aspect.

For exemplary purposes, details are set forth in order to provide an understanding of the disclosed subject matter. It will be understood, however, that the disclosed subject matter can be practiced and implemented without these specific details.

A load-based tire inflation system 20 (FIG. 1) according to one aspect, is described generally and is for use on a heavy-duty vehicle (not shown). The load-based tire inflation system 20 continuously monitors the load of the heavy-duty vehicle and automatically and continually adjusts fluid pressure in tires of the heavy-duty vehicle based on the load or total weight of the heavy-duty vehicle. This continuous and automatic pressure adjustment in the tires optimizes the pressure for a given load condition. This type of adjustment improves fuel economy of the heavy-duty vehicle and performance and service life of the tires and reduces equipment downtime and maintenance. As a result, the operating cost of the heavy-duty vehicle is desirably reduced. Monitoring the load of the heavy-duty vehicle may be accomplished by a fluid connection to one or more air springs, a ride height control valve, a lift axle controller, or any other component or system of the heavy-duty vehicle that is indicative of the total load or weight of the heavy-duty vehicle. For purposes of the subject disclosure, the term "load" is intended to mean the total weight of the heavy-duty vehicle during various operational situations or conditions. For example, load means the total weight of the heavy-duty vehicle when empty or carrying no cargo, the total weight of the heavy-duty vehicle when carrying a full load of cargo, or the total weight of the heavy-duty vehicle in any situation or condition between empty of cargo and full of cargo.

The load-based tire inflation system 20 includes a source of fluid pressure 22 (FIG. 1), such as compressed air or nitrogen, which may be stored in a pressure vessel or reservoir. The source of fluid pressure 22 may be any conduit leading to, or any conduit such as pneumatic conduit 128, that is capable of selective fluid communication with a tire and wheel assembly 60. As is known, the source of fluid pressure 22 is selected to be of a volume with sufficient pressure to operate components and systems of the heavy-duty vehicle, such as suspension structure or air spring 24 of an air ride suspension, the tire inflation system 20, and air actuated brakes (not shown). For the purpose of convenience, reference shall be made to one suspension structure or air spring 24, with the understanding that such reference may include and equally apply to more than one air spring and more than one axle. It will also be appreciated that use of the term "air spring" may include associated suspension structure, conduits, sensors and other equipment.

Each suspension structure or air spring 24 of the air ride suspension is in fluid communication with the source of fluid pressure 22 by a conduit 28. A valve 30 in the conduit 28 may control the fluid flow into and out of the air spring 24. The air spring 24 is located between a frame member 40 of the heavy-duty vehicle and an axle 42 of the heavy-duty vehicle. The frame member 40 may be any suitable frame component used for heavy-duty vehicles, such as a primary frame, a sub-frame, or a movable or non-movable slider, without affecting the overall concept of the disclosed subject matter. The air spring 24 suspends and/or positions the frame member 40 relative to the axle 42 as a function of fluid pressure in the air spring. Fluid pressure in the air spring 24 varies with the load or overall weight of the heavy-duty vehicle. While only one air spring 24 is illustrated in FIG. 1 for convenience and simplicity, it will be apparent that more than one air spring may be incorporated into the air ride suspension of the heavy-duty vehicle and that every air spring could be monitored and included in the load-based tire inflation system 20.

The air spring 24 may absorb forces that act on the heavy-duty vehicle during use and operation. It is generally desirable for the air spring 24 to be relatively rigid in order to resist roll forces and provide roll stability for the heavy-duty vehicle. It is also desirable for the air spring 24 to be relatively flexible to assist in cushioning the heavy-duty vehicle from impacts and compliance with a road surface. Thus, the fluid pressure in each air spring 24 can vary to provide the desired ride, handling, and other performance characteristics for the heavy-duty vehicle.

A fluid signal path 44 may be used to detect or directly communicate fluid pressure in the air spring 24. Alternatively, an air spring pressure sensor may be located in the air spring 24 or at any suitable location in the fluid path to the air spring 24, such as conduit 29, and may generate a signal indicative of the fluid pressure in air spring 24. The fluid pressure or signal communicated by fluid signal path 44 may be mechanical/pneumatic in nature, is indicative of the fluid pressure in the air spring 24, and may be communicated to a control system 46. Other suitable communication means, such as a wire or fiber optic, may be used if the signal is electrical. Such electrical signal may also be communicated to control system 46 wirelessly. The control system may include an electronic control unit (ECU).

The tire and wheel assembly 60 is operatively mounted to a wheel end assembly of the axle 42 of the heavy-duty vehicle and is relatively rotatable, as is known. The tire and wheel assembly 60 includes a tire 62 mounted on a rim or wheel 64, as is known. The tire and wheel assembly 60 is in fluid communication with a source of fluid pressure 22 over supply line or pneumatic conduit 128 that may extend through the axle 42. The source of fluid pressure 22 may be the same or a different source of fluid pressure in communication with the air spring 24. A valve (not shown) in the control system 46 controls the flow of fluid to the tire and wheel assembly 60. While only one air spring 24 and one pair of tire and wheel assemblies 60 on one side of the transversely extending axle 42 is illustrated in FIG. 1, the disclosed subject matter applies equally to a wide base single tire system on either side of the axle and to heavy-duty vehicles with multiple axles. If dual tire and wheel assemblies 60 are employed on an end of the axle 42 as illustrated in FIG. 1, both tires 62 are in fluid communication with one another as illustrated diagrammatically by line 80 extending between the tire and wheel assemblies.

A fluid signal path 82 may be provided to detect or directly communicate the fluid pressure in the tire and wheel assemblies 60. Alternatively, a tire pressure sensor may be located at any suitable location in the tires 62, tire and wheel assembly 60, or fluid path to one or more tires and wheel assemblies, such as third pneumatic conduit section 128, and may generate a signal indicative of the fluid pressure in the tire or tires 62 and wheel assembly or assemblies 60. The fluid pressure or signal communicated by fluid signal path 82 is indicative of the pressure in the tire and wheel assembly or assemblies 60 and may be communicated to control system 46. Other suitable communication means, such as a wire, may be used if the signal is electrical. Such electrical signal may also be communicated to the control system 46 wirelessly. The signal may be fluid or pneumatic in nature and could be communicated directly to control system 46.

The control system 46 adjusts fluid pressure in the tire and wheel assemblies 60 as a function of fluid pressure detected in air spring 24 or in response to some other system or device that can, directly or indirectly, continuously indicate, represent, or correlate to the load or weight of the heavy-duty vehicle. The control system 46 continuously monitors fluid pressure in the air spring 24 and can continually vary fluid pressure in the tire and wheel assembly 60 as a function thereof or in response thereto. Fluid pressure in the air spring 24 is directly proportional to, and indicative of, the weight of the heavy-duty vehicle, or load carried by the heavy-duty vehicle, such that the control system 46 does not have to calculate or estimate the mass or load. It is contemplated that control system 46 could, alternatively, be used to measure load-based fluid pressure in a suspension structure such as a lift air bag in a lift axle/suspension system or load-based input from a ride-height control valve, or the like.

The control system 46 of the disclosed subject matter load-based tire inflation system 20 may further include a regulator (not shown). The regulator may be used to establish a minimum pressure threshold for the tire and wheel assembly 60. Fluid pressure in the tire and wheel assembly 60 may then be maintained at or above the minimum pressure threshold. The load-based tire inflation system 20 may also include a second regulator (not shown) to establish a pressure level in the tire and wheel assembly 60 corresponding to vehicle load. This second regulator could allow fluid pressure in the tire and wheel assembly 60 to be maintained at a pressure level that is optimal for reducing tire wear and extending tire life. The control system 46 could serve as regulating apparatus to establish one or both of the minimum pressure threshold and the optimal pressure level of the tire and wheel assembly 60.

Thus, if the heavy-duty vehicle is not carrying any cargo or is essentially empty, the air spring 24 may have a relatively low fluid pressure at or near its minimum operating pressure in the range of about 15 pounds per square inch (psi) to about 40 psi. The pressure of the tire and wheel assembly 60 would be near the minimum threshold pressure in the range of about 40 psi to about 70 psi. The control system 46 could maintain the pressure in the tire and wheel assembly 60 at or near the minimum threshold pressure until the load in the heavy-duty vehicle changes. When the heavy-duty vehicle is loaded, the air spring 24 typically has a different and relatively higher pressure in the range of about 60 psi to about 90 psi. Once pressure in air spring 24 achieves a level that corresponds to an optimal tire pressure level above the minimum threshold pressure, control system 46 could begin regulating tire pressure based on vehicle load. The control system 46 would then proportionately, automatically, and continuously change the pressure in the tire and wheel assembly 60 in response to a change in the pressure of the air spring 24. The pressure of the tire and wheel assembly 60 would be near the optimal pressure in the range of about 75 psi to about 150 psi when the heavy-duty vehicle is partially or fully loaded. The source of fluid pressure 22 is sufficiently sized and maintained at a constant pressure above the pressure and volume in the air spring 24 and required by the tire and wheel assembly 60 by a predetermined amount in order to quickly fill the tire and wheel assembly.

The disclosed subject matter load-based tire inflation system 20, according to another aspect, may also include a means for establishing fluid pressure in the tire and wheel assembly 60 as a function of a differential pressure between the air spring 24 and tire and wheel assembly. For example, differential pressure switch 32 (FIG. 2), or a valve or other appropriate means known in the art, may be incorporated into control system 46 or as a separate unit. The differential pressure switch 32 may be in communication with fluid signal paths 44, 82. The differential pressure switch 32 may detect differences between the fluid signal path 44 and fluid signal path 82. Alternatively, the differential pressure switch 32 may directly detect differences in pressure between the air spring 24 and tire and wheel assembly 60. In the alternative, the differential pressure switch 32 may be in direct communication with the air spring 24 and tire and wheel assembly 60.

Generally, for a given heavy-duty vehicle load and tire and air spring combination, optimal tire pressures may be a predetermined difference from air spring pressure. Thus, a difference between the pressure in the air spring 24 and pressure in the tire and wheel assembly 60 can be used to determine whether the tires are at an optimal pressure appropriate for the load. The predetermined pressure differential may be in the range of about 0 psi to about 50 psi. Particularly, the predetermined pressure differential may be in the range of about 0 psi to 35 psi. The differential pressure switch 32 detects when the difference in the pressure in the tire 62, or the fluid signal path 82, and the pressure in the air spring 24, or the fluid signal path 44, is different than the predetermined pressure differential. The differential pressure switch 32 may operatively connect to control system 46 to initiate inflation or deflation. Alternatively, differential pressure switch 32 may operate independent of control system 46 to provide an independent warning mechanism in case of tire inflation system failure as below.

The differential pressure switch 32 may be operatively connected to an indicator light 314. The differential pressure switch 32 may then generate a signal in response to a detected pressure differential different from the predetermined pressure differential. Such signal may then be transmitted to indicator light 314 that may be present in a visible area on the interior or exterior of the heavy-duty vehicle. Thus, indicator light 314 provides notice to a heavy-duty vehicle operator that inflation pressure of one or more tires is in the process of adjusting or requires adjustment.

A method of using one aspect of the disclosed subject matter load-based tire inflation system 20 (FIG. 1) for a heavy-duty vehicle includes the step of providing at least one source of fluid pressure 22. The source of fluid pressure 22 supplies a fluid, such as compressed air or nitrogen, to the air spring 24 and the tire and wheel assembly 60. The fluid pressure and fluid flow supplied may be from a single source of fluid pressure 22 or may be supplied by separate and independent sources of fluid pressure.

Fluid pressure in the air spring 24 varies with the load or weight of the heavy-duty vehicle and is detected as an indication of weight or load of the heavy-duty vehicle. A fluid signal path 44 may be provided that detects or directly communicates the fluid pressure in the air spring 24. Alternatively, an air spring pressure sensor (not shown) may be located in the air spring 24 or in fluid communication with the air spring to generate a signal indicative of the air pressure therein. The signal or fluid pressure communicated by fluid signal path 44 is indicative of the fluid pressure in the air spring 24, is a function of load of the heavy-duty vehicle, and may be communicated to a control system 46. Alternatively, other suitable communication means may be used. The fluid signal path 44 may communicate via mechanical/pneumatic means or electrical/electronic means depending on components used in control system 46.

A tire and wheel assembly 60 is provided that is in fluid communication with a source of fluid pressure 22 over supply line or third pneumatic conduit section 128. The control system 46 is fluidly connected to the source of fluid pressure 22 and the third pneumatic conduit section 128 and controls the flow of fluid to the tire and wheel assembly 60.

A second fluid signal path 82 may be provided and used to detect or directly communicate the fluid pressure in the tire and wheel assembly 60. Alternatively, a tire pressure sensor (not shown) may be located in the tires 62, tire and wheel assembly 60, or in fluid communication with the tires or tire and wheel assembly to generate a signal indicative of the air pressure in the tire and wheel assembly. The signal or fluid pressure communicated by fluid signal path 82 is indicative of the pressure in the tire and wheel assembly 60 and may be communicated to the control system 46. Alternatively, other suitable communication means may be used. The signal may be fluid or pneumatic in nature and communicated to the control system 46 over suitable communication means, such as a pneumatic conduit. Fluid pressure in the tire and wheel assembly 60 may be sensed by monitoring the delivery pressure in third pneumatic conduit section 128, which relates to the tire pressure.

The control system 46 establishes fluid pressure in the tire and wheel assembly 60 as a function of fluid pressure detected in the air spring 24. The control system 46 controls fluid pressure in the tire and wheel assembly 60 and continuously adjusts pressure automatically in the tire and wheel assembly as a function of fluid pressure detected in the air spring 24. The control system 46 may establish tire pressure in the tire and wheel assembly 60 as a discrete differential or offset of air spring pressure from pressure in the tire and wheel assembly, as a discrete ratio or proportion of air spring pressure, or as a combination of differential and proportional control. The fluid pressure in the air spring 24 is indicative and representative of the weight of the heavy-duty vehicle, or load carried by the heavy-duty vehicle.

Figure 3:
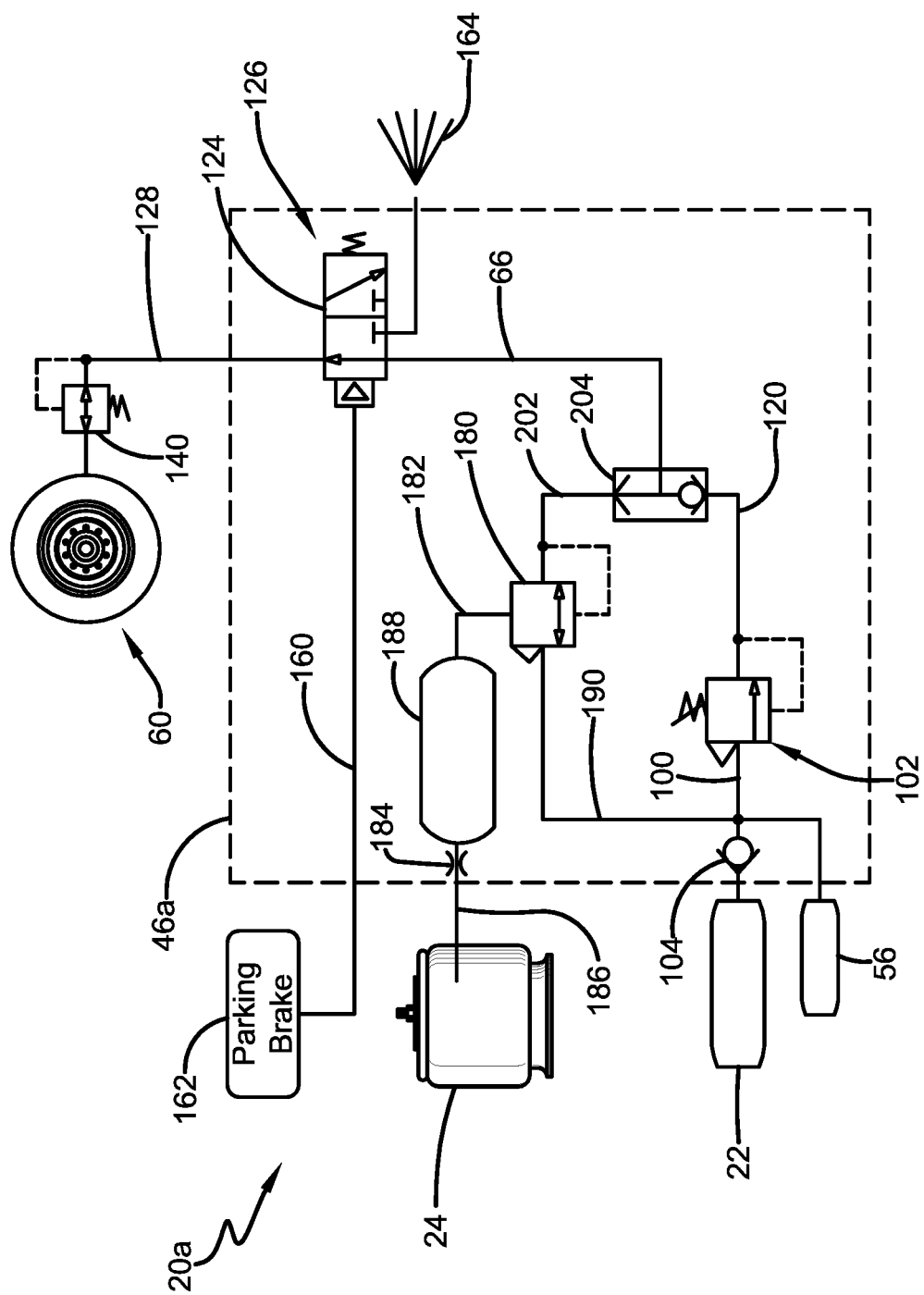
FIGS. 3-11 are schematic diagrams of exemplary implementations of control systems of the load-based tire inflation system.

The control system 46 of the disclosed subject matter load-based tire inflation system 20 may have a plurality of configurations. One such variation of control system 46 is diagrammatically illustrated in FIG. 3 as control system 46a of a load-based tire inflation system 20a for a heavy-duty vehicle. The load-based tire inflation system 20a includes the vehicle air supply or source of fluid pressure 22, such as compressed air. The source of fluid pressure 22 typically includes a compressor and/or a reservoir tank and will be referred to below for the purpose of convenience as the source of fluid pressure. The source of fluid pressure 22 is connected, by components to be described below, to the tire and wheel assembly 60 through the control system 46a and is constantly pressurized. For the purpose of convenience, only a single tire and wheel assembly 60 is illustrated in FIG. 3, but it is to be understood that the load-based tire inflation system 20a typically is utilized with single or dual tires mounted to opposite ends of the axle 42. The heavy-duty vehicle may have more than one axle 42 connected to the load-based tire inflation system 20a. The pneumatic conduit 66, and other conduit sections or portions to be described below, extend among and interconnect components of the load-based tire inflation system 20a.

More particularly, a first pneumatic conduit section 100 of the pneumatic conduit 66 extends between and is fluidly connected to the source of fluid pressure 22 and to a minimum threshold regulator 102 through a one-way check valve 104. The minimum threshold regulator 102 preferably is a regulator valve that is adjustable to a setting that actuates or opens the valve at a desired pressure level that is the minimum threshold pressure for tire and wheel assembly 60, such as in the range of about 40 psi to about 85 psi. The minimum threshold regulator 102 enables the load-based tire inflation system 20a to provide a desired minimum operating pressure for the tire and wheel assembly 60 to be maintained.

A second pneumatic conduit section 120 is fluidly connected to and extends from the minimum threshold regulator 102. The minimum threshold regulator 102 is a relieving regulator. When the air pressure in second pneumatic conduit section 120 drops below the minimum threshold pressure or other desired operating pressure for tire and wheel assembly 60, the minimum threshold regulator 102 opens and enables air to flow from source of fluid pressure 22, through first pneumatic conduit section 100, to the second pneumatic conduit section 120 and eventually to the tire and wheel assembly 60 to raise the pressure of the tire and wheel assembly.

The second pneumatic conduit section 120 and pneumatic conduit 66 are fluidly connected to and extend between the minimum threshold regulator 102 and a tire isolation pilot valve 124 of a tire isolation system 126. When the tire isolation pilot valve 124 is in an open position, air may flow through the isolation pilot valve and through a third pneumatic conduit section 128 to a wheel valve 140 and ultimately to the tire and wheel assembly 60. The load-based tire inflation system 20a includes a wheel valve 140 for each tire and wheel assembly 60. Each wheel valve 140 is capable of isolating a respective tire and wheel assembly 60 from the rest of the load-based tire inflation system 20a. The wheel valve 140 actuates or opens at a selected pressure setting or pressure level that is below any likely minimum target inflation pressure, thereby enabling air flow to the tire and wheel assembly 60 from load-based tire inflation system 20a. In this manner, wheel valve 140 remains open during normal operating conditions of the heavy-duty vehicle and the tire and wheel assembly 60, including times during operation other than extreme or emergency conditions. In the event of an extreme or emergency condition, such as low or insufficient pressure in the third pneumatic conduit section 128, the wheel valve 140 closes and isolates the respective tire and wheel assembly 60 from the rest of load-based tire inflation system 20a.

When a heavy-duty vehicle is parked for an extended period of time, the pneumatic pressure in the source of fluid pressure 22 may drop or bleed down due to small air leaks that are typical in any pneumatic system. When the pneumatic pressure in source of fluid pressure 22 drops after the vehicle has been parked, it is possible for the pneumatic pressure in the tire and wheel assembly 60 to also drop, which may be a drop of up to about 25 psi. In addition, some heavy-duty vehicles are designed to vent pressure in the air spring 24 when the heavy-duty vehicle is parked, resulting in the load-based tire inflation system 20a reacting as though it were a lightly-loaded vehicle with no tire isolation system 126 present. Then, when the vehicle is started up to prepare for travel, the tire and wheel assembly 60 must be re-inflated to or near the target pressure, which may involve adding about 25 psi to each one of eight or more tires. This re-inflation process typically takes a relatively long amount of time and places repeated demands on a tire inflation system, which may reduce the efficiency and/or life of the load-based tire inflation system. In addition, if the vehicle operator does not wait for tire and wheel assembly 60 to be re-inflated to the target pressure before operating the vehicle, the tire and wheel assemblies 60, in turn, may be operated in an under-inflated condition until the target pressure is reached, which can undesirably reduce the life of the tires 62. The wheel valve 140 and the tire isolation pilot valve 124 assist in preventing these conditions from occurring.

One way to re-inflate the tire and wheel assembly 60 in a relatively short period of time is to provide an optional boost source of pressurized air 56 in fluid communication with the first pneumatic conduit section 100. The boost source of pressurized air 56 may be a pressure vessel storing air at a pressure higher than the source of fluid pressure 22 to deliver additional pressurized air to the tire and wheel assembly 60 when needed. The boost source of pressurized air 56 may also incorporate or be fluidly connected with a secondary booster compressor (not shown) operating at a pressure higher than the source of fluid pressure 22.

A parking brake conduit 160 may extend between and be fluidly connected to the tire isolation pilot valve 124 and a parking brake 162 of the heavy-duty vehicle. For heavy-duty vehicle applications, the parking brake 162 may also be referred to as an emergency brake. When the parking brake 162 is actuated, a pneumatic signal is communicated to the tire isolation pilot valve 124. The connection of tire isolation pilot valve 124 to the parking brake 162 enables the tire isolation pilot valve and the wheel valves 140 to isolate the tire and wheel assembly 60 when the vehicle is parked. It should be apparent that actuation of the parking brake 162 may generate an electrical signal that can be communicated to an electronically operated tire isolation pilot valve. The parking brake conduit 160, which may also be referred to as the emergency/supply line, releases parking brake 162 when pressurized.

The tire isolation pilot valve 124 may be biased to a position that obstructs or blocks the fluid flow from the pneumatic conduit 66 and exhausts or vents to atmosphere 164 the flow of air coming from the third pneumatic conduit section 128. Once the fluid is vented to atmosphere 164, wheel valve 140 closes to seal the tire and wheel assembly 60 from the rest of the load-based tire inflation system 20a, thereby eliminating the risk of losing air from the tire and wheel assembly.

As a result, when the heavy-duty vehicle is parked, there is little or no air pressure supplied to the parking brake 162. Pressure is not supplied by the controller 46 when the parking brake 162 is engaged. The tire isolation pilot valve 124, thus, obstructs or blocks the fluid coming from the pneumatic conduit 66 and may exhaust to atmosphere 164 the flow of fluid coming from third pneumatic conduit section 128. Thus, fluid communication between the source of fluid pressure 22 and the tire and wheel assembly 60 is interrupted. This interruption of fluid communication between source of fluid pressure 22 and tire and wheel assembly 60 isolates the tire and wheel assembly from the source of fluid pressure, which in turn minimizes the pressure loss of the tire and wheel assembly when the heavy-duty vehicle is parked.

The sudden exhausting of the third pneumatic conduit section 128 causes the wheel valve 140 to close. The tire isolation pilot valve 124 initiates this process, and wheel valve 140 isolates tire and wheel assembly 60 from the rest of the load-based tire inflation system 20a and, more importantly, the other tire and wheel assemblies on the heavy-duty vehicle. For example, as described above, a source of fluid pressure, and thus a tire and wheel assembly 60, may experience a pressure drop of up to 25 psi or more when the heavy-duty vehicle is parked for an extended period of time. With the use of the tire isolation system 126, including tire isolation pilot valve 124, such a pressure drop in the tire and wheel assembly 60 may be reduced to less than 1 psi over the same extended period of time.

Air pressure is applied to emergency/supply line 160 to release the parking brake 162. Since the tire isolation pilot valve 124 is in fluid communication with the parking brake 162 by parking brake conduit 160, the air pressure moves the isolation pilot valve to an open position. Opening the tire isolation pilot valve 124 enables air to flow between the pneumatic conduit 66 and the third pneumatic conduit section 128.

The tire isolation system 126 is an optional feature that is particularly useful in the load-based tire inflation system 20a to minimize pressure loss in tire and wheel assembly 60 when the vehicle is parked, thereby minimizing the need to provide significant re-inflation of the tires for operation. Minimizing the need to provide significant re-inflation of the tire and wheel assembly 60 in turn significantly reduces the time required to inflate the tire and wheel assembly upon putting the heavy-duty vehicle into service, and also reduces undesirable demands on the load-based tire inflation system 20a, which may increase the life of the tire inflation system. The tire isolation system 126 also increases the life of tire 62 by reducing the possibility that the tire and wheel assembly 60 will be operated at less than the target pressure. Moreover, by using mechanical components, which are mechanically and/or pneumatically actuated, the tire isolation system 126 is reliable, economical, and is relatively easy to install and use.

It is to be understood that tire isolation system 126 prevents fluid communication between the remainder of the load-based tire inflation system 20a and tire and wheel assembly 60 when the parking brake 162 is engaged. Likewise, when the parking brake 162 is released, the heavy-duty vehicle is operating; there is fluid communication between the remainder of the load-based tire inflation system 20a and the tire and wheel assembly 60.

A pilot operated relieving regulator 180 is fluidly connected to the first pneumatic conduit section 100 in a manner that is pneumatically parallel to the minimum threshold regulator 102. By being fluidly connected with the first pneumatic conduit section 100, the pilot operated relieving regulator 180 is fluidly connected to the source of fluid pressure 22. The pilot operated relieving regulator 180 includes a pilot operator and a regulator. The pilot operator of the pilot operated relieving regulator 180 responds to an input pressure. The input pressure which actuates pilot operated relieving regulator 180 is provided by the air spring 24 of the heavy-duty vehicle.

The pilot operated relieving regulator 180 is similar to a typical regulator, except the force that opens the supply seat comes from pilot pressure from the air spring 24, not from a spring and an adjustment knob. As an optional feature in load-based tire inflation system 20a, the pilot operated relieving regulator 180 may also include an adjustable spring force to offset the pressure output relative to the pilot pressure. Such a feature enables pneumatic pressure to the tire and wheel assembly 60 to be adjusted higher or lower when the proper operating pressures of the tire and wheel assembly and the air spring 24 do not match one another.

The load-based tire inflation system 20a may include a choke fitting or choke 184 that is fluidly connected to one or more air spring(s) 24. Choke 184 provides a fluid connection to the air spring 24, so that the pneumatic pressure in the air spring may be communicated to pilot operated relieving regulator 180 without draining significant air pressure from the air spring, in the event of a system failure. A volumetric structure such as a control volume 188, which may be an auxiliary or supplemental reservoir, pressure vessel, or conduit, may be fluidly connected to choke 184 downstream of air spring 24. A conduit 186 fluidly connects the air spring 24 with the control volume 188. A conduit 182 connects the control volume 188 to the pilot operated relieving regulator 180. The conduit 182, choke 184, conduit 186, and control volume 188 may comprise the fluid signal path 44 (FIG. 1).

The air spring 24 is fluidly connected to a source of compressed air, such as the source of fluid pressure 22 used to supply the tire and wheel assembly 60. It will be appreciated, however, that the air spring 24 may be supplied by a source different than the source of fluid pressure 22 that supplies the tire and wheel assembly 60. When the heavy-duty vehicle carries a relatively heavy load of freight, a ride height control valve (not shown) actuates the flow of air from the source of fluid pressure 22 into the air spring 24 to bring the pneumatic pressure in the air spring(s) to a level that is optimal for supporting the relatively heavy load and maintaining a desired ride height of the heavy-duty vehicle. When the heavy-duty vehicle carries a relatively lighter load of freight, the ride height control valve actuates to exhaust air from the air spring(s) 24 to reduce the pressure in the air spring to again bring the pneumatic pressure in the air spring to a level that is optimal for supporting the relatively lighter load and maintaining a desired ride height of the vehicle. In this manner, the air spring 24 has a pneumatic pressure that corresponds to the load of the vehicle, and thus provides an indication of the load of the heavy-duty vehicle.

As the heavy-duty vehicle travels, it typically encounters bumps, depressions, and/or other obstacles which cause the air ride axle/suspension system to respond, which in turn causes air spring 24 to compress or extend. When air spring 24 compresses, such as when it encounters a bump, the pressure within the air spring increases, which is referred to in the art as a pressure spike, and when the air spring extends, such as when it encounters a depression, the pressure within the air spring decreases, which is referred to as a pressure drop. Since such pressure spikes and drops are due to articulation of the axle/suspension system from travel of the heavy-duty vehicle, they are transitory, and are thus undesirable for inclusion in the input signal or pressure from air spring 24 to pilot operated relieving regulator 180. Thus, the control volume 188 could provide a volume that dissipates pressure spikes and drops, and thus, condition the signal that air spring 24 provides to the pilot operated relieving regulator 180.

More particularly, when the heavy-duty vehicle carries a relatively heavy load of freight or cargo, air spring 24 has a relatively high pneumatic pressure level that is communicated to the pilot operated relieving regulator 180. The pilot operated relieving regulator 180 responds to the input pressure signal and actuates. The pilot operated relieving regulator 180 then opens in a manner that is proportional to the input pressure signal, enabling air to flow from source of fluid pressure 22 through a conduit 190 and through the pilot operated relieving regulator.

When the heavy-duty vehicle carries a relatively lighter load of freight or cargo, the air spring 24 has a relatively lower pneumatic pressure level that is communicated to the pilot operated relieving regulator 180. The pilot operated relieving regulator 180 responds to the input pressure signal and closes off supply. The pilot operated relieving regulator 180 then allows air from the tire to exhaust to atmosphere. More particularly, the pilot operated relieving regulator 180 removes pressure from tire and wheel assembly 60 and exhausts it to atmosphere when lowering pressure in the tire and wheel assembly 60. When there is a relatively lighter load of freight in the heavy-duty vehicle, because the response of pilot operated relieving regulator 180 is proportional to the pressure signal from air spring 24, the air supplied from source of fluid pressure 22 through the pilot operated relieving regulator is delivered at a lower pressure than when the heavy-duty vehicle carries a relatively heavier load of freight.

The pilot operated relieving regulator 180 enables automatic and continuous adjustment of the volume of air flow from source of fluid pressure 22 or air flow to atmosphere from the tires in a manner that corresponds to the input signal indicative of pressure in the air spring 24. Such automatic and continuous adjustment of the volume of air flow from source of fluid pressure 22 by the pilot operated relieving regulator 180 establishes a corresponding pressure in the tire and wheel assembly 60. Because the air spring 24 has a pneumatic pressure related to the load of the heavy-duty vehicle, the pilot operated relieving regulator 180 and load-based tire inflation system 20*a* enable constant adjustment of the pneumatic pressure in tire and wheel assembly 60 based on the load of the heavy-duty vehicle.

A shuttle valve or shuttle-type two-way check valve 204, referred to in the industry and throughout this description as a check valve, is fluidly connected to the pilot operated relieving regulator 180 by a conduit 202. The check valve 204 is also fluidly connected to the tire isolation system 126. The check valve 204 is also in fluid communication with the source of fluid pressure 22 through the minimum threshold regulator 102 and second pneumatic conduit section 120. The check valve 204 receives pressure from the pilot operated relieving regulator 180, and pressure from the minimum threshold regulator 102. The check valve 204, thus, delivers fluid flow to the tire and wheel assembly 60 from the higher pressure that is proportional to pressure in the air spring 24 or the established minimum pressure delivered by the minimum threshold regulator 102.

If the pressure level from the pilot operated regulator 180, which is a function of pressure in air spring 24, is less than the pressure established by the minimum threshold regulator 102 and the tire pressure drops to this pressure as well, check valve 204 shuttles, thereby preventing air flow from the conduit 66 to the pilot operated relieving regulator 180. If the pressure in tire and wheel assembly 60 continues to drop, the minimum threshold regulator 102 opens and supplies air to the second pneumatic conduit section 120, thereby maintaining a minimum pressure in the tire and wheel assembly. If the minimum threshold regulator 102 is set to 70 psi, the check valve 204 would close off the flow of air to the pilot operated regulator 180 once the delivery pressure from pilot operated regulator 180 drops below 70 psi. Such a setting allows the minimum threshold regulator 102 or the pilot operated regulator 180, depending on the state of the check valve 204, to remove air from tire and wheel assembly 60 down to approximately 70 psi when, for example, the vehicle is unloaded.

When the parking brake 162 is not engaged, there is fluid communication among the pneumatic conduit 66, third pneumatic conduit section 128, wheel valves 140 and tire and wheel assembly 60 through the tire isolation system 126. Thus, when there is no air flow to the second pneumatic conduit section 120 and the pressure output of the pilot operated regulator 180 is below the output pressure of the minimum threshold regulator 102, there is no air flow to the tire and wheel assembly 60 from the source of fluid pressure 22. If the pressure level signal from air spring 24 initiates an output pressure from the pilot operated regulator 180 that is greater than the set pressure level from minimum threshold regulator 102, air is allowed to flow from pilot operated relieving regulator 180 to pneumatic conduit 66, the third pneumatic conduit section 128, wheel valves 140 and ultimately to tire and wheel assembly 60. It will be appreciated that pressure in the air spring 24 can be lower than the minimum threshold regulator 102 setting and still actuate the pilot operated regulator 180 to deliver higher output pressure.

The load-based tire inflation system 20*a*, thus, includes a way to continually monitor the load carried by a heavy-duty vehicle and automatically and continuously adjust the pneumatic pressure in the tire and wheel assembly 60 based on the load in the heavy-duty vehicle. This is done by fluidly connecting at least one air spring 24, which has a pneumatic pressure level that corresponds to the load, to the pilot operated relieving regulator 180. The pilot operated relieving regulator 180 responds to a pressure signal from the air spring 24, and enables air to flow from source of fluid pressure 22 to the tire and wheel assembly 60 in a manner that is proportional to the pressure signal from the air spring. Because the air spring 24 has a pneumatic pressure level that corresponds to the vehicle load, the pilot operated relieving regulator 180 and the load-based tire inflation system 20*a* enable automatic and continuous adjustment of the pneumatic pressure in tire and wheel assembly 60 based on the load of the heavy-duty vehicle. Such automatic and continuous adjustment optimizes the inflation pressure of tire and wheel assembly 60, thereby improving fuel economy and the performance and service life of the tires, which in turn desirably reduces the downtime and operating cost of the heavy-duty vehicle.

The load-based tire inflation system 20*a* only employs mechanical and pneumatic components that are mechanically and/or pneumatically actuated. The load-based tire inflation system 20*a*, thus, is relatively reliable, economical, and is easy to install and use. It is also understood that control system 46*a* could, alternatively, be used to measure load-based fluid pressure in a suspension structure such as a lift air bag in a lift axle/suspension system or load-based input from a ride-height control valve, or the like.

The load-based tire inflation system 20*a* may be a constant-pressure system that does not exhaust air to atmosphere unless the heavy-duty vehicle load has been reduced and the tire inflation system responds by reducing tire pressure and the tire isolation system 126 is energized, or there is a system issue. It is to be appreciated that such a constant pressure system retains at least some amount of pressure in at least conduit 128, and may not hold the same amount or level of pressure all of the time. As a result, the load-based tire inflation system 20*a* continuously monitors tire pressure and dynamically responds to pressure changes in the air spring 24, which is indicative of changes in load of the heavy-duty vehicle, thereby providing an active and quick response to the tire and wheel assembly 60.

Figure 4:
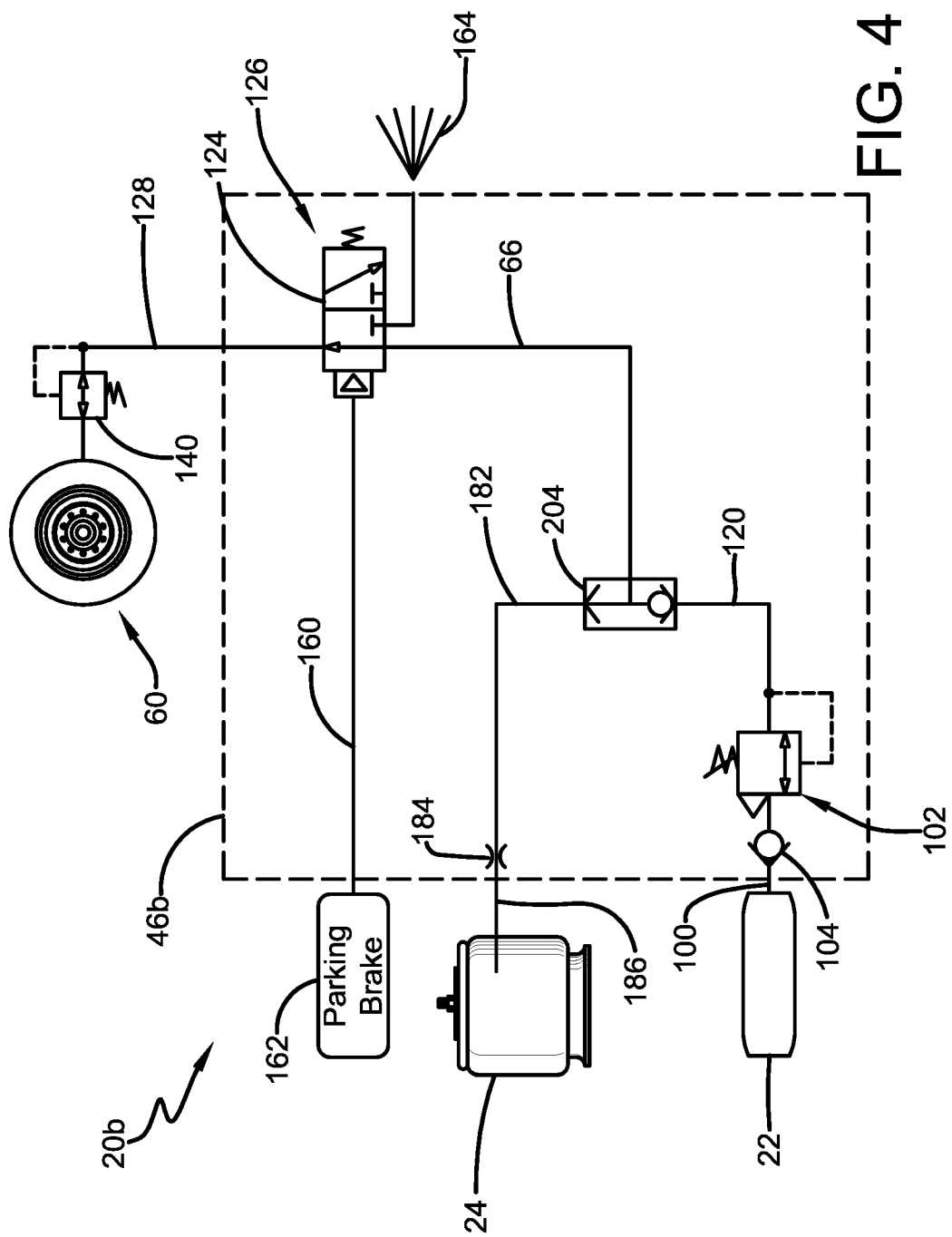

Another control system 46*b* utilized in a load-based tire inflation system 20*b*, constructed according to a second exemplary aspect, for heavy-duty vehicles is illustrated in FIG. 4 and described below. The control system 46*b* of the load-based tire inflation system 20*b* continually monitors pressure in the air spring 24 and establishes the pressure in the tire and wheel assembly 60 of the heavy-duty vehicle as a function of pressure in the air spring.

The load-based tire inflation system 20*b* is similar in structure and function to the first load-based tire inflation system 20*a*, mainly illustrated in FIG. 3 and described above. As a result, the description below is directed to the differences in structure and operation between the load-based tire inflation system 20*b* illustrated in FIG. 4 and the load-based tire inflation system 20*a* illustrated in FIG. 3.

The load-based tire inflation system 20*b* may eliminate the pilot operated relieving regulator 180 and the control volume 188 that is employed in the first load-based tire inflation system 20*a*. Eliminating these components reduces the cost, complexity and air consumption of the load-based tire inflation system 20*b* when compared to the first load-based tire inflation system 20*a*. Reference numerals of unchanged components remain the same throughout the drawings. and any description for components or sub-systems that are the same as those in any previous load-based tire inflation system will not be described.

The load-based tire inflation system 20*b* may optionally include the choke 184, which is fluidly connected to air spring 24 through conduit 186, and provides a fluid connection without draining significant air pressure from the air spring. The choke 184 may be in the form of a relatively small diameter conduit or portion of conduit in conduit 186. The load-based tire inflation system 20*b* does not have a control volume to condition the pneumatic signal from the air spring 24. The air spring 24 is fluidly connected to the check valve 204 through the conduit 182. In this manner, the check valve 204 receives fluid flow from the second pneumatic conduit section 120 from the minimum threshold regulator 102, and from the air spring 24. The check valve 204 in turn is fluidly connected to the tire isolation system 126 through pneumatic conduit 66.

The fluid connection of the check valve 204 to the minimum threshold regulator 102 and to the air spring 24 ensures that the pressure level of the air flowing to the tire and wheel assembly 60 is above the desired minimum operating pressure set by the minimum threshold regulator. The check valve 204, thus, receives a pressure level signal directly from the air spring 24 and a pressure level signal from the source of fluid pressure 22 through the minimum threshold regulator 102. If the pressure level signal from the air spring 24 is less than the pressure level from minimum threshold regulator 102, the output flow from minimum threshold regulator establishes and/or maintains the pressure to tire and wheel assembly 60 at the low threshold or above. If the pressure level signal from the air spring 24 is greater than the pressure level from the minimum threshold regulator 102, air flow to the tire and wheel assembly 60 is directly provided by the air spring. In this state, the vehicle air spring control valve (not shown) can increase or decrease pressure in the tire and wheel assembly 60.

The operation of the tire isolation pilot valve 124 and the tire isolation system 126 are similar to that as described above for load-based tire inflation system 20*a*. When the heavy-duty vehicle is parked and the parking brake 162 is engaged, the tire isolation system 126 isolates the tire and wheel assembly 60 by exhausting third pneumatic conduit section 128 to atmosphere 164. This activates the wheel valve 140 to close and maintain pressure in the tire and wheel assembly. When the heavy-duty vehicle is operating, and parking brake 162 is released, fluid may flow through the tire isolation pilot valve 124, through the pneumatic conduit 66 to the third pneumatic conduit section 128, to the wheel valve 140 and tire and wheel assembly 60.

The load-based tire inflation system 20*b*, thus, constantly monitors the load or weight of a heavy-duty vehicle and continually and automatically adjusts the pneumatic pressure in tire and wheel assembly 60 as a function of the vehicle load. Such automatic adjustment optimizes the inflation pressure of tire and wheel assembly 60, thereby improving fuel economy and the performance and life of the tires, which in turn desirably reduces the operating cost of the heavy-duty vehicle. The load-based tire inflation system 20*b* only employs components that are mechanically and/or pneumatically actuated. The load-based tire inflation system 20*b*, thus, is relatively reliable, economical, and is easy to install and use.

The load-based tire inflation system 20*b* may be a constant-pressure system that does not exhaust air to atmosphere unless the tire isolation system 126 is energized and pressure in the air spring 24 is lower than pressure in the tire and wheel assembly 60, or there is a system issue. It is to be understood that such a constant-pressure system retains some amount of pressure in at least conduit 128, and may not hold the same amount or level of pressure all of the time. As a result, the load-based tire inflation system 20*b* continuously monitors tire pressure and automatically responds to pressure changes in the air spring 24 to provide an active and quick response to reduced tire pressure conditions. It is also understood that control system 46*b* could, alternatively, be used to measure load-based fluid pressure in a suspension structure such as a lift air bag in a lift axle/suspension system or load-based input from a ride-height control valve, or the like.

Figure 5:
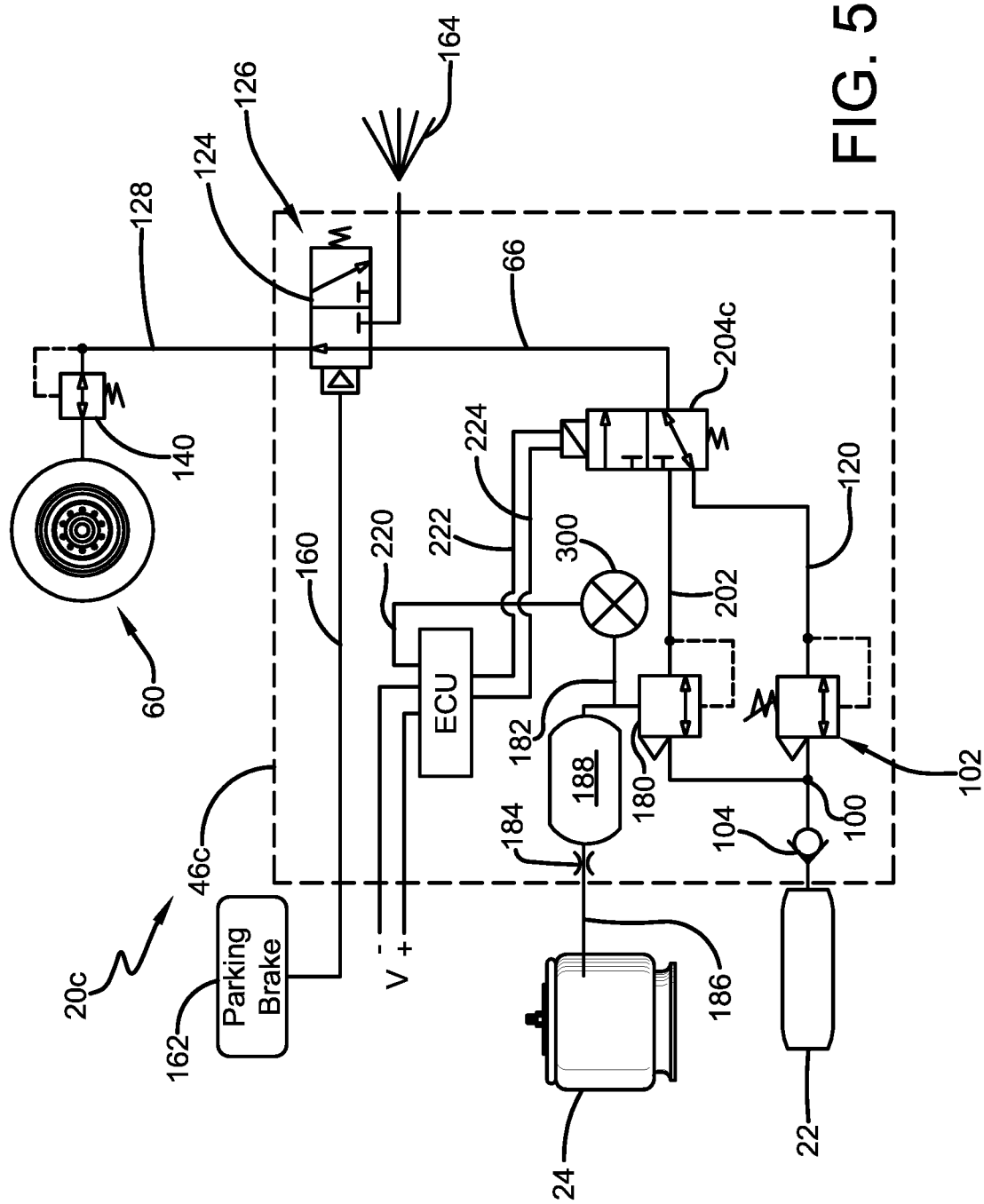

Another, or third, control system 46*c* used in a load-based tire inflation system 20*c*, constructed according to another exemplary aspect, for heavy-duty vehicles is illustrated in FIG. 5 and described below. The load-based tire inflation system 20*c* is similar in structure and function to the load-based tire inflation systems 20*a* and 20*b* illustrated in FIGS. 3 and 4 and described above. As a result, the description below is directed to the differences in structure and operation between the load-based tire inflation system 20*c* illustrated in FIG. 5 and the load-based tire inflation systems 20*a* and 20*b* illustrated in FIGS. 3 and 4. Reference numerals of unchanged components remain the same throughout the drawings.

The source of fluid pressure 22 is connected, through components to be described below, to the tire and wheel assembly 60 through the control system 46*c*. The fluid connection is accomplished by various conduit sections or portions that extend among and interconnect components of the load-based tire inflation system 20*c*.

The pilot operated relieving regulator 180 is fluidly connected to first pneumatic conduit section 100 in a manner that is pneumatically parallel to the minimum threshold regulator 102. By being fluidly connected with the first pneumatic conduit section 100, the pilot operated relieving regulator 180 is fluidly connected to the source of fluid pressure 22. In one aspect of the load-based tire inflation system 20*c*, the input pressure which actuates pilot operated relieving regulator 180 is provided by the air spring 24 of the heavy-duty vehicle.

The load-based tire inflation system 20*c* may include the choke 184 that is fluidly connected to one or more air spring(s) 24. A volumetric structure such as a control volume 188, which may be an auxiliary or supplemental reservoir or pressure vessel, may be fluidly connected to choke 184 downstream of air spring 24.

The control volume 188 is fluidly connected to the pilot operated relieving regulator 180 by the pneumatic conduit 182 that extends between the control volume 188 and the pilot operated relieving regulator. In this manner, the relative pressure level in air spring 24 is communicated from the air spring through choke 184, conditioned by control volume 188, and communicated through the conduit 182 to the pilot operated relieving regulator 180. The pilot operated relieving regulator 180, thus, receives the pressure signal from air spring 24 and responds to the signal. The pilot operated relieving regulator 180 opens in a manner that is proportional to the pressure signal from the air spring, enabling air to flow through the pilot operated relieving regulator.

The pilot operated relieving regulator 180 enables automatic and continuous adjustment of the volume of air flow from source of fluid pressure 22 to the tire and wheel assembly 60 in a manner that corresponds to the pressure signal from the air spring 24. Such automatic and continuous adjustment of the volume of air flow from source of fluid pressure 22 by the pilot operated relieving regulator 180 delivers a proportional pressure to the tire and wheel assembly 60. The pilot operated regulator 180 can also remove air from the tire and wheel assembly 60 to lower the pressure in the tire and wheel assembly when the vehicle load and air spring pressure is reduced.

Pressure in a solenoid valve 204*c* and in the conduit 202 is controlled by pressure in the air spring 24. The solenoid valve 204*c* is also fluidly connected to the tire isolation system 126. The solenoid valve 204*c* is also in fluid communication with the source of fluid pressure 22 through the minimum threshold regulator 102 and second pneumatic conduit section 120. The solenoid valve 204*c* receives a pressure level signal controlled by the pressure level from air spring 24. The solenoid valve 204*c* delivers fluid flow to the tire and wheel assembly 60 from the pilot operated relieving regulator 180 or minimum threshold regulator 102, based on the level of pressure in the air spring 24.

While fully mechanical or pneumatic control systems 20 are preferred, there may be circumstances where an electronic control unit (ECU) may be desired or required. For example, a pressure transducer, or switch, 300 is fluidly connected with the conduit 182, which is fluidly connected to air spring 24 through control volume 188, and provides an indication to the ECU of the pressure in the air spring 24 over line 220.

The ECU may be any suitable electronic control unit. For example, the ECU could be an electronic control unit dedicated to the control system 46*c* of the load-based tire inflation system 20*c*. The ECU could be an electronic control unit that is shared with an anti-lock braking system (not shown) of the heavy-duty vehicle. The ECU controls the opening and closing of the solenoid valve 204*c* by lines 222 and 224 to establish pressure in the tire and wheel assembly 60. The solenoid valve 204*c*, thus, controls the pressure supplied to the tire and wheel assembly 60 by fluidly connecting the pilot operated relieving regulator 180 or fluidly connecting the minimum threshold regulator 102 to the tire and wheel assembly 60, through pneumatic conduit 66. When the pressure in air spring 24 corresponds to a tire pressure above the low threshold, the ECU signals the solenoid valve 204*c* to remain energized, fluidly connecting the pilot operated regulator 180 to the tire and wheel assembly 60. When the pressure in the air spring 24 corresponds to a tire pressure at or below the low threshold, the solenoid valve 204*c* is de-energized, fluidly connecting the minimum threshold regulator 102 to the tire and wheel assembly. Pressure in the tire and wheel assembly is then maintained at the low threshold setting. If vehicle power is lost, for any reason, solenoid valve 204*c* automatically connects the minimum threshold regulator 102 to the tire and wheel assembly 60. This ensures that tire pressure does not drop below the low threshold even when electric power is lost. The solenoid valve 204*c* is shown in the de-energized state in FIG. 5.

The load-based tire inflation system 20*c* may be a constant-pressure system that does not exhaust air to atmosphere unless the heavy-duty vehicle load has been reduced and the tire inflation system responds by reducing tire pressure and the tire isolation system 126 is energized, or there is a system issue. It is to be appreciated that such a constant pressure system retains at least some amount of pressure in at least conduit 128, and may not hold the same amount or level of pressure all of the time. As a result, the load-based tire inflation system 20*c* continuously monitors tire pressure and dynamically responds to pressure changes in the air spring 24, which is indicative of changes in load of the heavy-duty vehicle, thereby providing an active and quick response to the tire and wheel assembly 60.

The load-based tire inflation system 20c, thus, includes a way to constantly monitor the load carried by a heavy-duty vehicle and automatically and continuously adjust the pneumatic pressure in the tire and wheel assembly 60 based on the load in the heavy-duty vehicle. At least one air spring 24, which has a pneumatic pressure level that corresponds to the vehicle load, is fluidly connected with pressure transducer, or switch, 300 and is communicated to the ECU. The solenoid valve 204c responds to a signal from the ECU, and enables air to flow from source of fluid pressure 22 through the pilot operated relieving regulator 180 to the tire and wheel assembly 60 in a manner that is proportional to the pressure signal from the air spring. It is also understood that control system 46c could, alternatively, be used to measure load-based fluid pressure in a suspension structure such as a lift air bag in a lift axle/suspension system or load-based input from a ride-height control valve, or the like.

Figure 6:
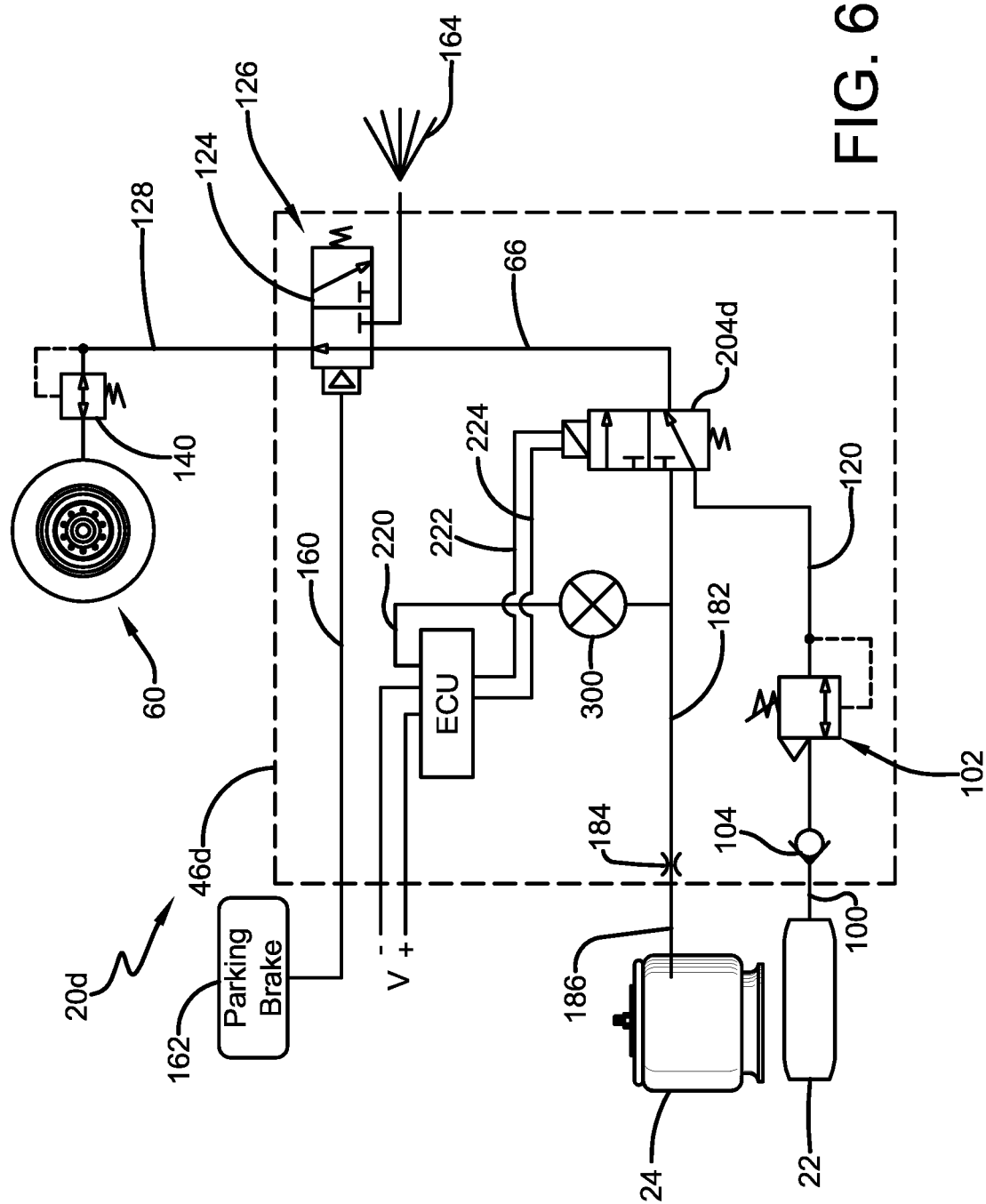

Another control system 46d used in a load-based tire inflation system 20d, constructed according to an exemplary aspect, for heavy-duty vehicles is illustrated in FIG. 6 and described below. The control system 46d of the load-based tire inflation system 20d is similar in structure and function to the load-based tire inflation system 20c illustrated in FIG. 5 and relatively simpler. Thus, the description below is directed to the differences between the load-based tire inflation system 20d illustrated in FIG. 5 and the load-based tire inflation system 20c illustrated in FIG. 5.

The load-based tire inflation system 20d eliminates the pilot operated relieving regulator 180 and the control volume 188 that is employed in the load-based tire inflation system 20c. Eliminating these components reduces the cost, complexity and air consumption of the load-based tire inflation system 20d when compared to the load-based tire inflation system 20c. The control system 46d used in the load-based tire inflation system 20d functions substantially the same as the third control system 46c, except that when tire pressure is above the low threshold, tire pressure is controlled by the air spring 24 pressure or suspension control directly. Reference numerals of unchanged components remain the same throughout the drawings.

The load-based tire inflation system 20d includes the vehicle air supply or source of fluid pressure 22, such as compressed air. The source of fluid pressure 22 is connected, through components to be described in detail below, with the tire and wheel assembly 60 through the control system 46d. The fluid connection is accomplished by various conduit sections or portions that extend among and interconnect components of the load-based tire inflation system 20d.

The second pneumatic conduit section 120 is fluidly connected to and extends from the minimum threshold regulator 102 to a solenoid valve 204d. When the air pressure in second pneumatic conduit section 120 drops below the minimum threshold pressure or other desired operating pressure for tire and wheel assembly 60, minimum threshold regulator 102 opens and enables air to flow from source of fluid pressure 22, through first pneumatic conduit section 100, to the second pneumatic conduit section 120 and eventually to the tire and wheel assembly 60 to raise the tire and wheel assembly to the low threshold pressure.

The load-based tire inflation system 20d may include the choke 184 that is in direct fluid communication with one or more air spring(s) 24. The air spring 24 is fluidly connected to the solenoid valve 204d by the pneumatic conduit 182.

The solenoid valve 204d is also fluidly connected to the tire isolation system 126. The solenoid valve 204d is also in fluid communication with the source of fluid pressure 22 through the minimum threshold regulator 102 and second pneumatic conduit section 120. The solenoid valve 204d delivers fluid flow to the tire and wheel assembly 60 from the higher pressure supplied from the air spring 24 or the source of fluid pressure 22.

A pressure transducer, or switch, 300 is connected with the conduit 182 and provides a signal to an electronic control unit (ECU) over line 220 indicative of the pressure in the air spring 24. The ECU may be any suitable electronic control unit. For example, the ECU could be an electronic control unit dedicated to the control system 46d of the load-based tire inflation system 20d. The ECU could be an electronic control unit that is shared with an anti-lock braking system (ABS) of the heavy-duty vehicle. The ECU controls the opening and closing of the solenoid valve 204d to establish and maintain pressure in the tire and wheel assembly 60. The solenoid valve 204d controls the pressure supplied to the tire and wheel assembly 60 by the air spring 24 or the output of the minimum threshold regulator 102, whichever is greater. When the pressure in the air spring 24 is above the low threshold, the ECU energizes the solenoid valve 204d to fluidly connect pressure in the air spring 24 to the tire and wheel assembly 60. In this state, air pressure in the tire and wheel assembly 60 can be increased or decreased by the vehicle air spring control valve to match pressure in the air spring 24. When the pressure in the air spring 24 is below the low threshold, the solenoid valve 204d is de-energized, and pressure in the tire and wheel assembly 60 will be maintained at the low threshold pressure setting.

The load-based tire inflation system 20d may be a constant-pressure system that does not exhaust air to atmosphere unless the heavy-duty vehicle load has been reduced and the tire inflation system responds by reducing tire pressure and the tire isolation system 126 is energized, or there is a system issue. It is to be appreciated that such a constant pressure system retains at least some amount of pressure in at least conduit 128, and may not hold the same amount or level of pressure all of the time. As a result, the load-based tire inflation system 20d continuously monitors tire pressure and dynamically responds to pressure changes in the air spring 24, which is indicative of changes in load of the heavy-duty vehicle, thereby providing an active and quick response to the tire and wheel assembly 60.

The load-based tire inflation system 20d, thus, includes a way to monitor the load carried by a heavy-duty vehicle and automatically and continuously adjusts the pneumatic pressure in the tire and wheel assembly 60 based on the load in the heavy-duty vehicle. At least one air spring 24 has a pneumatic pressure level that corresponds to the vehicle load and is monitored by the pressure transducer 300 and communicated to the ECU. The solenoid valve 204d responds to a signal from the ECU, and enables air to flow from source of fluid pressure 22, through the minimum threshold regulator 102, or the air spring 24 to the tire and wheel assembly 60 in a manner that is proportional to the pressure signal from the air spring. It is also understood that control system 46d could, alternatively, be used to measure load-based fluid pressure in a suspension structure such as a lift air bag in a lift axle/suspension system or load-based input from a ride-height control valve, or the like.

Figure 7:
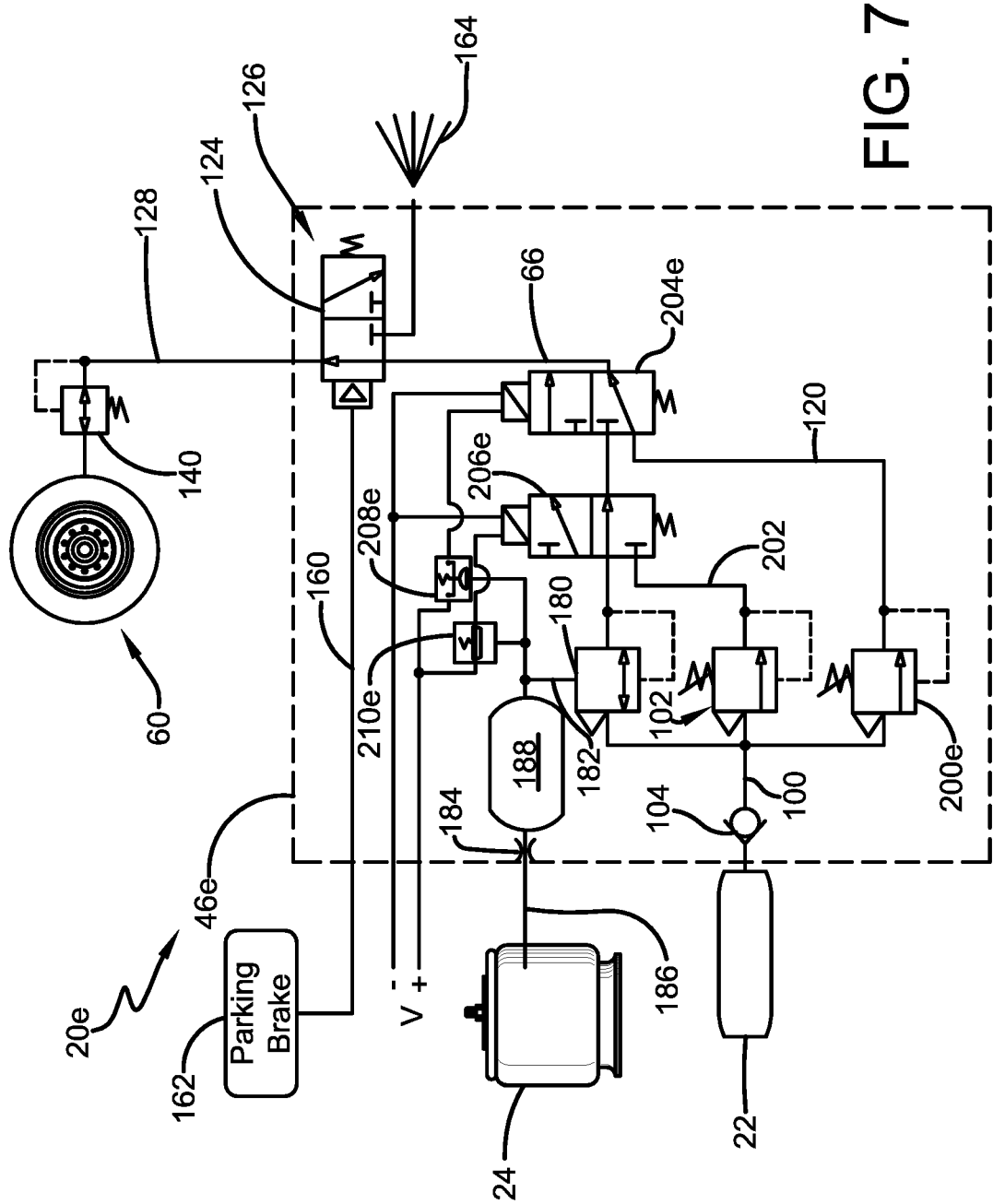

Another, control system 46e used in a load-based tire inflation system 20e, constructed according to another exemplary aspect for heavy-duty vehicles is illustrated in FIG. 7 and described below. The load-based tire inflation system 20e is similar in structure and function to the load-based tire inflation systems described above. As a result, the description below is directed to the differences in structure and operation between the load-based tire inflation system 20e illustrated in FIG. 7 and the load-based tire inflation systems described above. Reference numerals of unchanged components remain the same throughout the drawings.

The second pneumatic conduit section 120 is fluidly connected to a three-way solenoid valve 204e. The operation of the solenoid valve 204e is controlled by a normally open pressure switch 208e. The pressure switch 208e is in fluid communication with the air spring 24 through conduit 182. Pressure switch 208e is designed to open at a very low pressure, indicative of an air spring that is completely exhausted or not capable of maintaining an empty heavy-duty vehicle at the design ride height. Such a condition might occur if there is a component failure of an air spring, air spring control valve, or other component.

The pilot operated relieving regulator 180 is fluidly connected with the first pneumatic conduit section 100 via conduit 190 so that it is pneumatically parallel to the minimum threshold regulator 102. By being fluidly connected to the first pneumatic conduit section 100, the pilot operated relieving regulator 180 is fluidly connected to the source of fluid pressure 22. The input pressure which actuates pilot operated relieving regulator 180 is provided by the air spring 24 of the heavy-duty vehicle.

The load-based tire inflation system 20e may include the choke 184 that is fluidly connected to one or more air spring(s) 24. A volumetric structure such as the control volume 188, which may be an auxiliary or supplemental reservoir or pressure vessel, is fluidly connected to the choke 184 downstream of air spring 24.

The solenoid valve 204e is fluidly connected to the pilot operated relieving regulator 180 and the minimum threshold regulator 102 through a solenoid valve 206e. The solenoid valve 204e is also fluidly connected to the to the tire isolation system 126. The solenoid valve 204e may also be in fluid communication with the source of fluid pressure 22 through a target pressure regulator 200e and the second pneumatic conduit section 120, for example, set to a target pressure that corresponds to an expected maximum load. The solenoid valve 204e receives an electric signal from the pressure switch 208e, which closes at a pressure level from air spring 24 that would be high enough to properly support an empty vehicle, approximately 10 psi. After reaching 10 psi, the energized solenoid valve 204e delivers fluid flow to the tire and wheel assembly 60 from the higher pressure that is controlled by the air spring 24 or the source of fluid pressure 22 through the minimum threshold regulator 102.

An electrically actuated pressure switch 210e is also in fluid communication with conduit 182, providing an indication of the pressure in the air spring 24. The pressure switch 210e controls the opening and closing of the solenoid valve 206e to allow fluid flow to the solenoid valve 204e and establish pressure in the tire and wheel assembly 60. The solenoid valves 206e and 204e control the pressure supplied to the tire and wheel assembly 60 by the pilot operated relieving regulator 180, controlled by air spring 24, or the source of fluid pressure 22 through the minimum threshold regulator 102, or the target pressure regulator 200e, depending on the state of the pressure switches 208e and 210e. When the pressure in air spring 24 corresponds to a pressure in the tire and wheel assembly 60 that is above the low threshold, the pressure switch 208e closes and pressure switch 210e opens. This energizes solenoid valve 204e and de-energizes solenoid valve 206e, to allow pilot operated regulator 180 to control the fluid supply to the tire and wheel assembly 60. When the pressure in the air spring 24 corresponds to a pressure below the minimum threshold, the pressure switch 210e signals solenoid valve 206e to switch control of the pressure in tire and wheel assembly 60 from the pilot operated regulator 180 to the minimum threshold regulator 102. If pressure in air spring 24 drops to an inoperable level, pressure switch 208e signals solenoid valve 204e to switch control of pressure in the tire and wheel assembly 60 to the target pressure regulator 200e. The target pressure regulator 200e maintains pressure in the tire and wheel assembly 60 at a selected pressure, preventing under-inflated tires when air spring or other component failure occurs, such as a loss of electrical power to the vehicle.

The load-based tire inflation system 20e may be a constant-pressure system that does not exhaust air to atmosphere unless the heavy-duty vehicle load has been reduced and the tire inflation system responds by reducing tire pressure and the tire isolation system 126 is energized, or there is a system issue. It is to be appreciated that such a constant pressure system retains at least some amount of pressure in at least conduit 128, and may not hold the same amount or level of pressure all of the time. As a result, the load-based tire inflation system 20e continuously monitors tire pressure and dynamically responds to pressure changes in the air spring 24, which is indicative of changes in load of the heavy-duty vehicle, thereby providing an active and quick response to the tire and wheel assembly 60.

The load-based tire inflation system 20e, thus, includes a way to non-electronically monitor the load carried by a heavy-duty vehicle and automatically and continuously adjust the pneumatic pressure in the tire and wheel assembly 60 based on the load in the heavy-duty vehicle. The means includes fluidly connecting at least one air spring 24, which has a pneumatic pressure level that corresponds to the vehicle load, to the pressure switches 208e and 210e. The solenoid valves 204e and 206e respond to signals from the respective pressure switches 208e and 210e, and enable air to flow from source of fluid pressure 22 or the pilot operated relieving regulator 180 to the tire and wheel assembly 60 in a manner that is proportional to the pressure signal from the air spring. Because the pressure in that air spring 24 corresponds to the vehicle load, the pressure switches 208e and 210e of the load-based tire inflation system 20e enable automatic and continuous adjustment of the pneumatic pressure in tire and wheel assembly 60 based on the load of the heavy-duty vehicle. The load based tire inflation system 20e will also default to a tire pressure setting for a fully loaded vehicle in the event of a component or system failure that prevents the air spring 24 from inflating properly or when there is loss of electrical power of the heavy-duty vehicle.

It is also understood that control system 46e could be used to measure load-based fluid pressure in other suspension structures. For example, control system 46e may measure a fluid pressure of a lift air bag in a lift axle/suspension system, a load-based input from a ride-height control valve, or the like.

Figure 8:
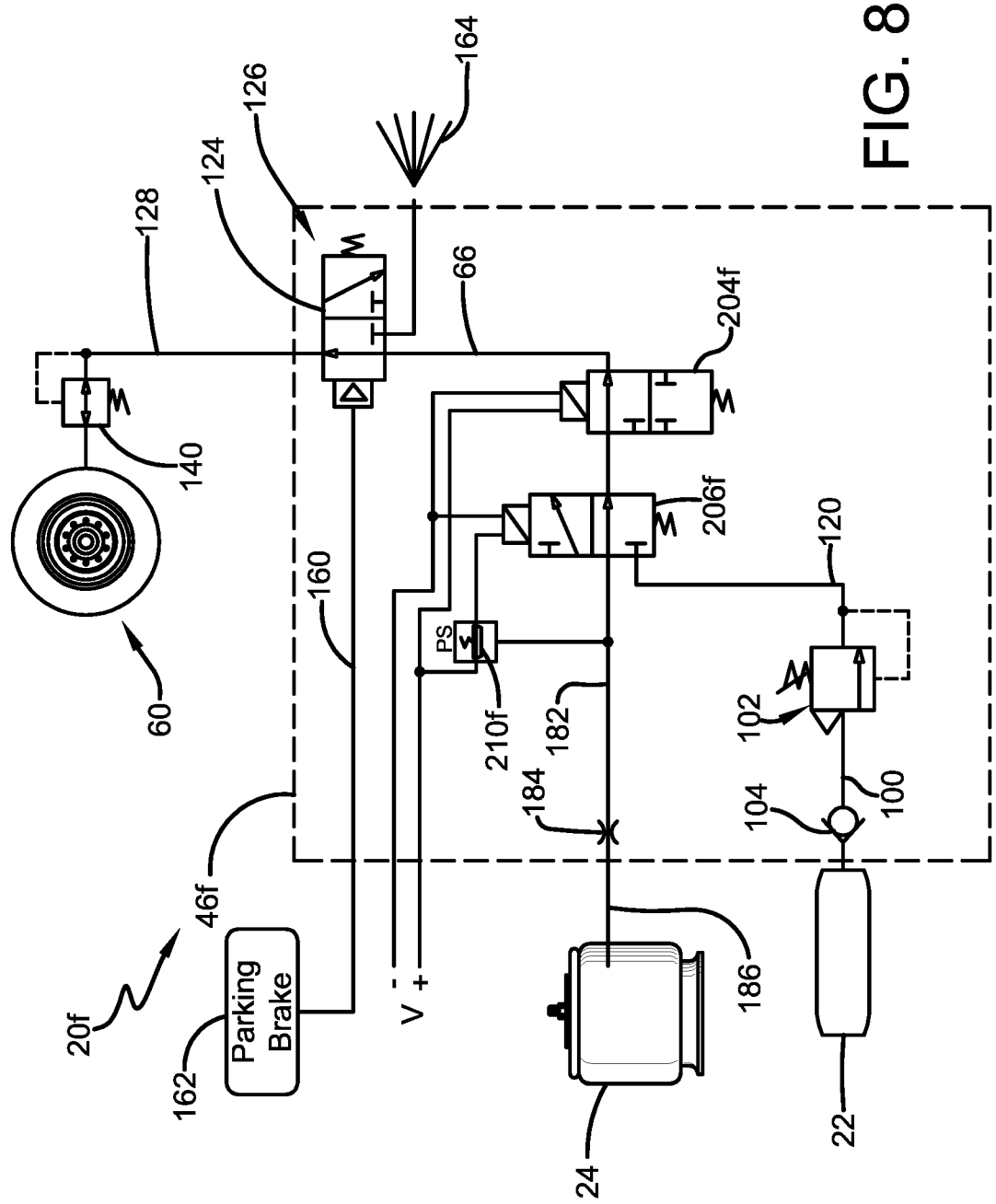

Another control system 46f used in a load-based tire inflation system 20f, constructed according to another exemplary aspect, for heavy-duty vehicles is illustrated in FIG. 8 and described below. The load-based tire inflation system 20f is simpler in structure than the load-based tire inflation system 20e illustrated in FIG. 7 and described above. As a result, the description below is substantially directed to the differences in structure and operation between the load-based tire inflation system 20f illustrated in FIG. 8 and the load-based tire inflation system 20e illustrated in FIG. 7. Reference numerals of unchanged components remain the same throughout the drawings.

The second pneumatic conduit section 120 is in fluid communication with the minimum threshold regulator 102 and a three-way solenoid valve 206*f*. When the air pressure in second pneumatic conduit section 120 drops below the minimum threshold pressure or other desired operating pressure for tire and wheel assembly 60, the minimum threshold regulator 102 opens and enables fluid flow from source of fluid pressure 22 through second pneumatic conduit section 120 through the three-way solenoid valve 206*f*, through a two-way solenoid valve 204*f* and ultimately to the tire and wheel assembly 60 to raise the tire and wheel assembly to the desired pressure. The operation of the solenoid valve 206*f* is controlled by a normally closed pressure switch 210*f*. The pressure switch 210*f* is in fluid communication with the air spring 24 through conduit 182.

The two-way solenoid valve 204*f* is fluidly connected to the air spring 24 through the solenoid valve 206*f*. The solenoid valve 204*f* is also fluidly connected to the to the tire isolation system 126. The solenoid valve 204*f* is normally closed and will only permit fluid communication from the source of fluid pressure 22 or the air spring 24 to the tire and wheel assembly 60 when vehicle electric power is present. Upon the loss of electrical power, the solenoid valve 204*f* closes to isolate the tire and wheel assembly 60 to prevent pressure loss in the tire and wheel assembly.

The electrically actuated pressure switch 210*f* is also in fluid communication with conduit 182 and provides an indication of the pressure in the air spring 24. The pressure switch 210*f* controls the opening and closing of the three-way solenoid valve 206*f* to allow fluid to flow through the solenoid valve 204*f* to establish and maintain pressure in the tire and wheel assembly 60. The solenoid valves 206*f* and 204*f* control the pressure supplied to the tire and wheel assembly 60 by the air spring 24 or the source of fluid pressure 22, depending on the setting of pressure switch 210*f*. When the pressure in air spring 24 is above the low threshold, the pressure switch 210*f* de-energizes the solenoid valve 206*f* to direct fluid flow from the air spring 24 to the tire and wheel assembly 60. When the pressure in the air spring 24 is below the low threshold, the pressure switch 210*f* energizes the solenoid valve 206*f* to direct pressure from the minimum threshold regulator 102 to flow to the tire and wheel assembly 60.

The load-based tire inflation system 20*f* may be a constant-pressure system that does not exhaust air to atmosphere unless the heavy-duty vehicle load has been reduced and the tire inflation system responds by reducing tire pressure and the tire isolation system 126 is energized, or there is a system issue. It is to be appreciated that such a constant pressure system retains at least some amount of pressure in at least conduit 128, and may not hold the same amount or level of pressure all of the time. As a result, the load-based tire inflation system 20*f* continuously monitors tire pressure and dynamically responds to pressure changes in the air spring 24, which is indicative of changes in load of the heavy-duty vehicle, thereby providing an active and quick response to the tire and wheel assembly 60.

The load-based tire inflation system 20*f*, thus, includes a way to non-electronically monitor the load carried by a heavy-duty vehicle and automatically and continuously adjust the pneumatic pressure in the tire and wheel assembly 60 based on the load in the heavy-duty vehicle. This includes fluidly connecting at least one air spring 24, which has a pneumatic pressure level that corresponds to the vehicle load, with the pressure switch 210*f*. The solenoid valve 206*f* responds to a signal from the pressure switch 210*f*, and enables air to flow from source of fluid pressure 22, through the minimum threshold regulator 102, or from the air spring 24 to the tire and wheel assembly 60 in a manner that is proportional to the pressure signal in the air spring. Because the air spring 24 has a pneumatic pressure level that corresponds to the vehicle load, the pressure switch 210*f* and solenoid valves 206*f* and 204*f* of the load-based tire inflation system 20*f*, thus, enable automatic and continuous adjustment of the pneumatic pressure in tire and wheel assembly 60 based on the load of the heavy-duty vehicle. The load-based tire inflation system 20*f* also preserves pressure in the tire and wheel assembly 60 in the event of power loss, power disconnect or is shut off by closing solenoid valve 204*f*. It is also understood that control system 46*f* could, alternatively, be used to measure load-based fluid pressure in a suspension structure such as a lift air bag in a lift axle/suspension system or load-based input from a ride-height control valve, or the like.

Figure 9:
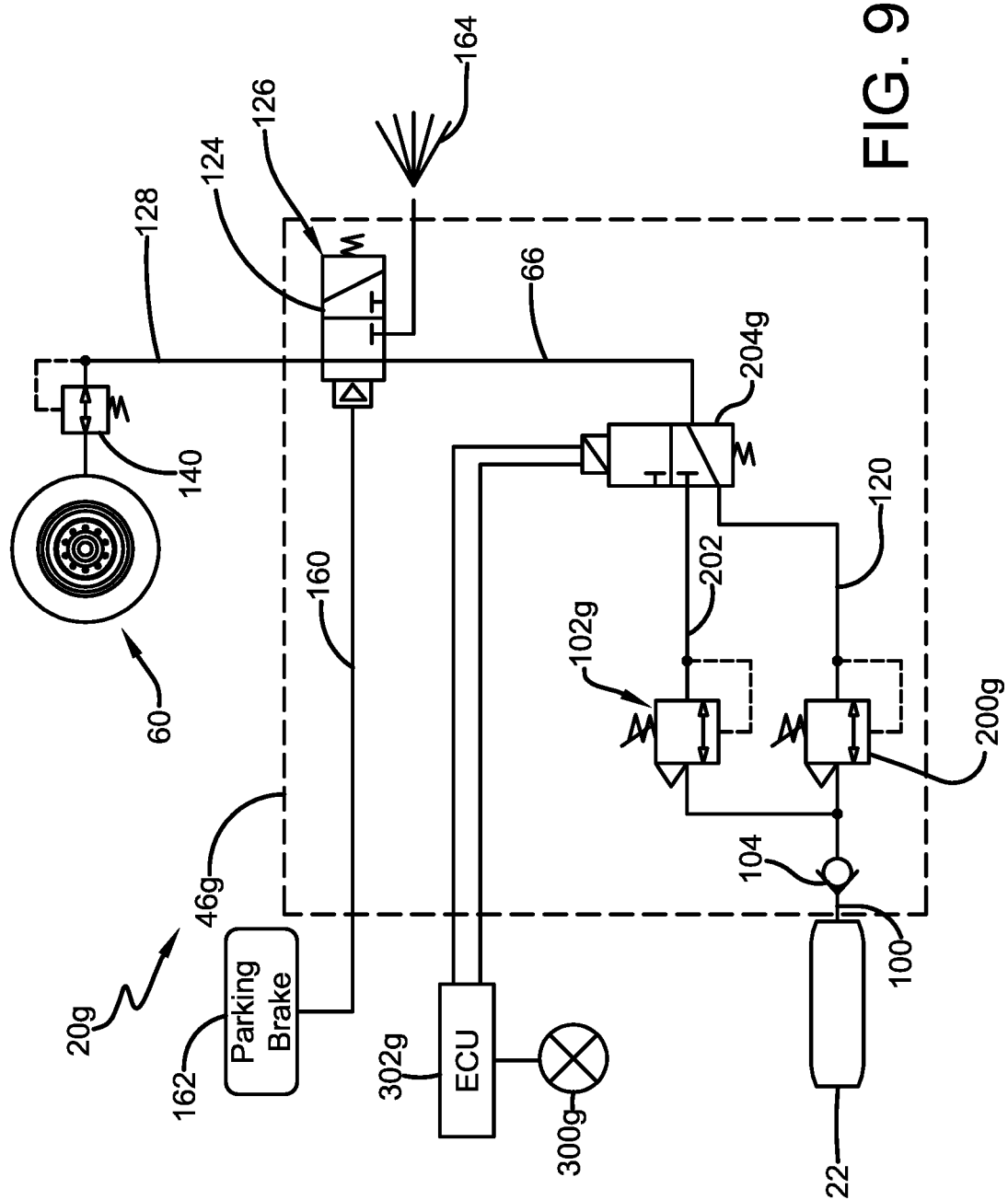

Another control system 46*g* used in a load-based tire inflation system 20*g*, constructed according to another exemplary aspect, for heavy-duty vehicles is illustrated in FIG. 9 and described below. The load-based tire inflation system 20*g* is similar in structure and function to the load-based tire inflation systems described above. As a result, the description below is directed to the differences in structure and operation between the previous load-based tire inflation systems. Reference numerals of unchanged components remain the same throughout the drawings.

Load-based tire inflation system 20*g* does not directly sense the load of the heavy-duty vehicle by monitoring pressure in an air spring. The load-based tire inflation system 20*g* is specifically designed for a vehicle configured with one or more liftable axles (not shown). Liftable axles are raised when the vehicle is lightly loaded and lowered when the vehicle has a relatively greater load. Load-based tire inflation system 20*g* allows higher or lower legal load limits per axle, depending on the number of axles in a group and the spacing of the axles. For example, in some instances, a single axle can legally carry 20,000 pounds. When two axles are closely spaced, to create an axle group, the legal load that each axle can carry is lowered to 17,000 lbs. Load-based tire inflation system 20*g* adjusts tire pressure for the two distinct maximum load conditions. The load-based tire inflation system 20*g* uses information from an axle lift control sensor, or the like, such as sensor 300*g* as an input that is indicative of the position of a liftable axle.

The second pneumatic conduit section 120 is fluidly connected to and extends from the lower axle load regulator 102*g* to a three-way solenoid valve 204*g*. A higher axle load regulator 200*g* is fluidly connected with first pneumatic conduit section 100 in a manner that is pneumatically parallel to the lower axle load regulator 102*g*. The higher axle load regulator 200*g* is set to a pressure threshold setting that corresponds to the legal load for the tires when the liftable axle is raised. By being fluidly connected with the first pneumatic conduit section 100, the higher axle load regulator 200*g* is fluidly connected to the source of fluid pressure 22.

The solenoid valve 204*g* is fluidly connected with the higher axle load regulator 200*g* by the second pneumatic conduit section 120. The solenoid valve 204*g* is also fluidly connected to the tire isolation system 126. The solenoid valve 204*g* is also in fluid communication with the source of fluid pressure 22 through the lower axle load regulator 102*g* and conduit 202. The solenoid valve 204*g* receives a control signal from the sensor 300*g* as an indication of the axle position. The solenoid valve 204*g* delivers fluid flow to the tire and wheel assembly 60 from the source of fluid pressure 22 when energized through the lower axle load regulator 102g or the higher axle load regulator 200g when solenoid valve 204g is de-energized.

The sensor 300g generates a signal that is indicative of the position of a liftable axle from systems such as an axle lift control sensor or the like. The sensor 300g communicates the signal to an electronic control unit (ECU) 302g. The ECU 302g controls solenoid valve 204g to establish and maintain pressure in the tire and wheel assembly 60. The solenoid valve 204g directs fluid flow to and from the tire and wheel assembly 60 via the higher axle load regulator 200g or the lower axle load regulator 102g. When the liftable axle is in the raised position, the ECU 302g de-energizes the solenoid valve 204g to fluidly connect the higher axle load regulator 200g to the tire and wheel assembly 60, increasing tire pressure. When the liftable axle is lowered, the ECU 302g energizes the solenoid valve 204g to open, and fluidly connects the lower axle load regulator 102g, reducing tire pressure to match the legal load limit.

The ECU 302g may be any suitable electronic control unit. For example, the ECU 302g could be an electronic control unit dedicated to the control system 46g of the load-based tire inflation system 20g. The ECU 302g could be an electronic control unit that is shared with an anti-lock braking system (ABS) of the heavy-duty vehicle.

The load-based tire inflation system 20g may be a constant-pressure system that does not exhaust air to atmosphere unless the heavy-duty vehicle load has been reduced and the tire inflation system responds by reducing tire pressure and the tire isolation system 126 is energized, or there is a system issue. It is to be appreciated that such a constant pressure system retains at least some amount of pressure in at least conduit 128, and may not hold the same amount or level of pressure all of the time. As a result, the load-based tire inflation system 20g continuously monitors tire pressure and dynamically responds to changes in load of the heavy-duty vehicle, thereby providing an active and quick response to the tire and wheel assembly 60.

The load-based tire inflation system 20g, thus, includes a way to monitor the load carried by a heavy-duty vehicle and automatically and continuously adjusts the pneumatic pressure in the tire and wheel assembly 60 based on the maximum legal load in the heavy-duty vehicle. This continuous monitoring of the position of the liftable axle of the heavy-duty vehicle that corresponds to the vehicle load is accompanied by a sensor 300g associated with an axle lift control sensor or the like that is communicated to the ECU 302g. The solenoid valve 204g responds to a signal from the ECU 302g, and enables air to flow from source of fluid pressure 22 to the tire and wheel assembly 60 in a manner that matches the maximum legal load limit of the heavy-duty vehicle. The sensor 300g and ECU 302g of the load-based tire inflation system 20g enable automatic and continuous adjustment of the pneumatic pressure in tire and wheel assembly 60 based on the position of a liftable axle of the heavy-duty vehicle. The position of a liftable axle is an indication of a lightly or heavily loaded vehicle. It is also understood that control system 46g could, alternatively, be used to measure load-based fluid pressure in a suspension structure such as an air spring or load-based input from a ride-height control valve, or the like.

Figure 10:
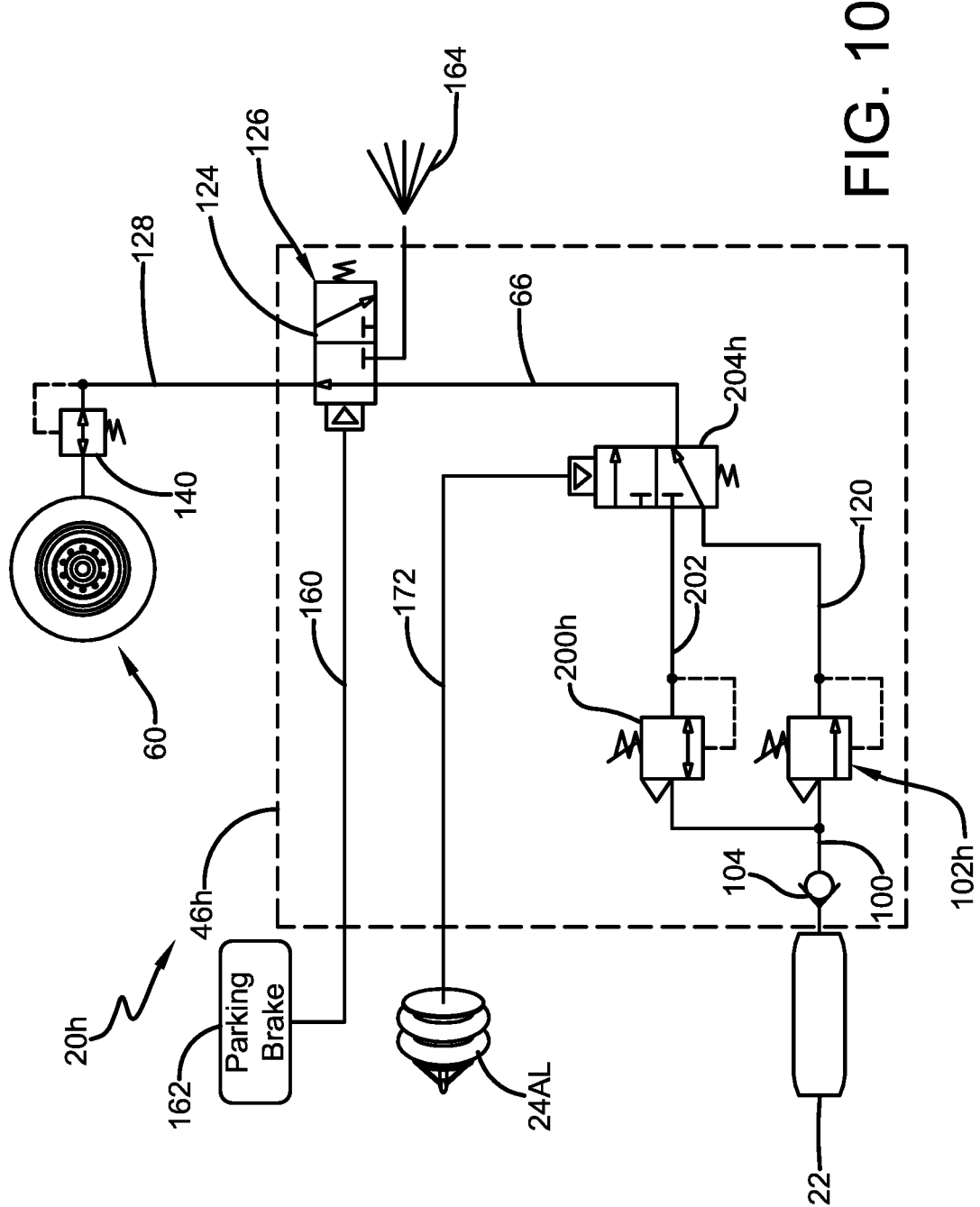

Another control system 46h used in a load-based tire inflation system 20h, constructed according to another exemplary aspect, for heavy-duty vehicles is illustrated in FIG. 10 and described below. The load-based tire inflation system 20h is similar in structure and function to the load-based tire inflation system 20g illustrated in FIG. 9 and described above. The description below is directed mainly to the differences in structure and operation between the load-based tire inflation system 20h illustrated in FIG. 10 and the load-based tire inflation system 20g. Reference numerals of unchanged components remain the same throughout the drawings.

The load-based tire inflation system 20h is directly controlled by pressure in a lift air bag 24AL that provides the force to raise a liftable axle of the heavy-duty vehicle. Fluid pressure in the tire and wheel assembly 60 is automatically selected as a function of the fluid pressure in the lift air bag 24AL. No electrical or electronic components are required to perform this operation.

The second pneumatic conduit section 120 is fluidly connected to and extends from the lower axle load regulator 102h to a three-way pilot valve 204h. The conduit 202 is fluidly connected to and extends between the higher axle load regulator 200h and a fluid controlled pilot valve 204h.

The lower axle load regulator 102h is fluidly connected with the first pneumatic conduit section 100 in a manner that is pneumatically parallel with the higher axle load regulator 200h. By being fluidly connected with the first pneumatic conduit section 100, the lower axle load regulator 102h and the higher axle load regulator 200h are both fluidly connected with the source of fluid pressure 22. In one aspect of the load-based tire inflation system 20h, the input pressure which actuates the pilot valve 204h is directly provided by the lift air bag 24AL of the heavy-duty vehicle.

The pilot valve 204h is fluidly connected to the higher axle load regulator 200h by the conduit 202. The pilot valve 204h is also fluidly connected to the tire isolation system 126. The pilot valve 204h is also in fluid communication with the source of fluid pressure 22 through the lower axle load regulator 102h and second pneumatic conduit section 120. The pilot valve 204h, upon actuation, delivers fluid flow to the tire and wheel assembly 60 from the source of fluid pressure 22 or the higher axle load regulator 200h. Pressure to actuate pilot valve 204h comes from the lift air bag 24AL.

A pneumatic conduit section 172 extends directly between the lift air bag 24AL and pilot valve 204h. A pneumatic signal that is indicative of a liftable axle in the raised position of the heavy-duty vehicle is communicated to the pilot valve 204h. The pneumatic signal controls the opening and closing of the pilot valve 204h to establish pressure in the tire and wheel assembly 60 as a function of pressure in the lift air bag 24AL which is indicative of the position of the liftable axle of the heavy-duty vehicle. The pilot valve 204h controls fluid flow to the tire and wheel assembly 60 from the higher axle load regulator 200h or the source of fluid pressure 22 when the liftable axle is raised. When the pressure in lift air bag 24AL is exhausted, indicating a liftable axle in the lowered position, the absence of pneumatic signal causes the pilot valve 204h to fluidly connect the lower axle load regulator 102h to the tire and wheel assembly 60. The lower axle load regulator 102h may then increase or reduce pressure in the tire and wheel assembly 60 as needed to maintain tire pressure required for the maximum legal load with the axle in the lowered or down position.

The load-based tire inflation system 20h may be a constant-pressure system that does not exhaust air to atmosphere unless the heavy-duty vehicle load has been reduced and the tire inflation system responds by reducing tire pressure and the tire isolation system 126 is energized, or there is a system issue. It is to be appreciated that such a constant pressure system retains at least some amount of pressure in at least conduit 128, and may not hold the same amount or level of pressure all of the time. As a result, the load-based tire inflation system 20h continuously monitors tire pressure and dynamically responds to pressure changes in the air spring 24AL, which is indicative of changes in load of the heavy-duty vehicle, thereby providing an active and quick response to the tire and wheel assembly 60.

The load-based tire inflation system 20h, thus, includes a way to monitor the position of a liftable axle of a heavy-duty vehicle and automatically establish the pneumatic pressure in the tire and wheel assembly 60 based on the position of a liftable axle heavy-duty vehicle. Because raising and lowering a liftable axle changes the number of axles in an axle group, as well as the axle spacing, the load an axle can legally carry will change. Load-based tire inflation system 20h monitors the position of a liftable axle of the heavy-duty vehicle with a pneumatic signal that corresponds to the position of the liftable axle that is communicated to pilot valve 204h. The pilot valve 204h responds to the pneumatic signal and controls pressurized air to flow from source of fluid pressure 22 to the tire and wheel assembly 60 that corresponds to the maximum legal load limit. The pneumatic signal of the load-based tire inflation system 20h automatically and continuously establishes the pressure in tire and wheel assembly 60 based on the maximum legal axle load of the heavy-duty vehicle without components requiring electrical power. It is also understood that control system 46h could, alternatively, be used to measure load-based fluid pressure in a suspension structure such as an air spring or load-based input from a ride-height control valve, or the like.

Figure 11:
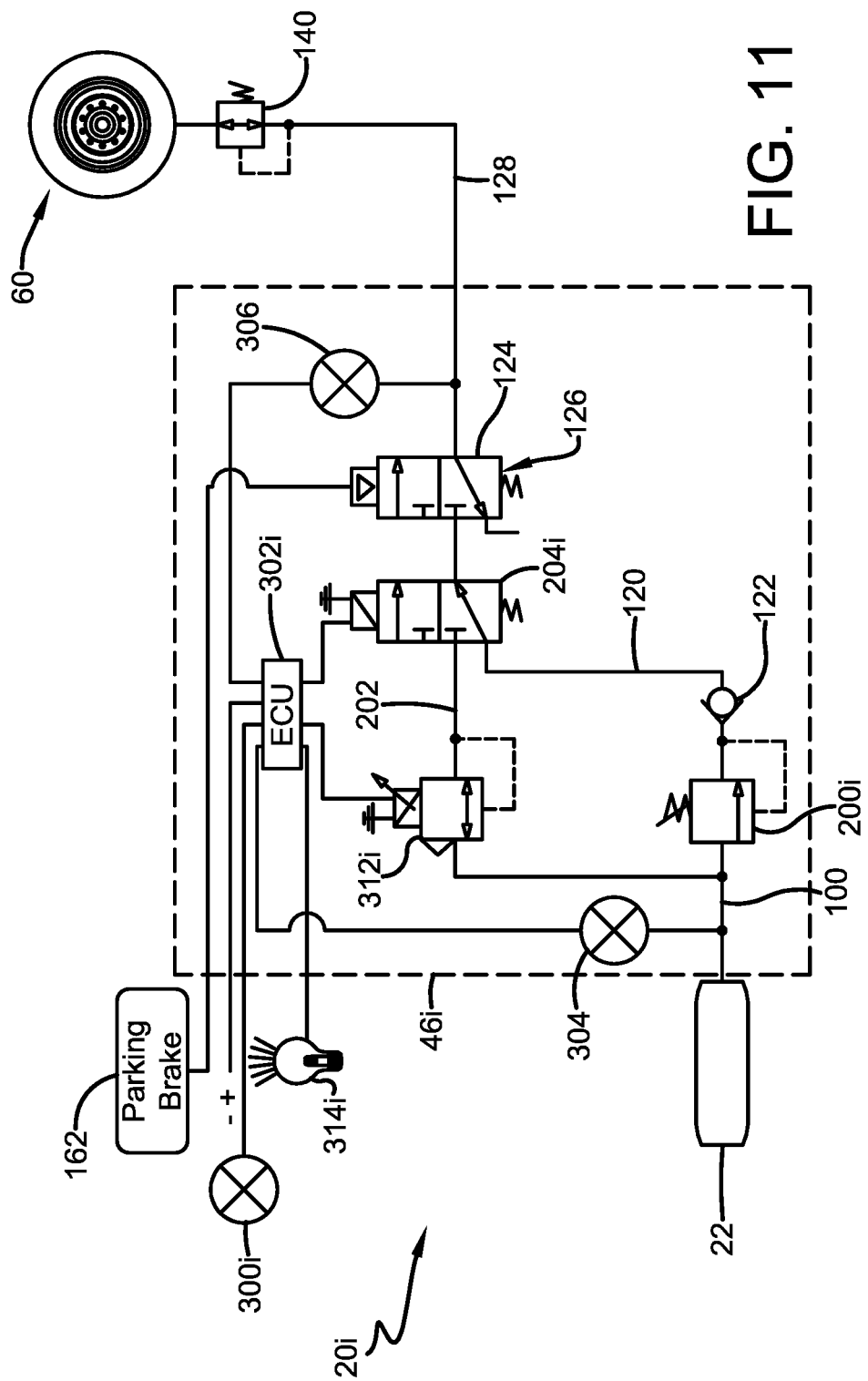

Another control system 46i used in a load-based tire inflation system 20i, constructed according to another exemplary aspect, for heavy-duty vehicles is illustrated in FIG. 11 and described below. The load-based tire inflation system 20i is similar in structure and function to the load-based tire inflation systems 20a-20h described above. The description below is mostly directed to the differences in structure and operation between the load-based tire inflation system 20i illustrated in FIG. 11 and the load-based tire inflation systems 20a-20h. Reference numerals of unchanged components remain the same throughout the drawings.

The second pneumatic conduit section 120 may be in fluid communication with and extend from the maximum threshold regulator 200i to a three-way solenoid valve 204i. The tire isolation pilot valve 124 is pneumatically connected with the parking brake 162. The tire isolation pilot valve 124 may be actuated by setting the vehicle parking brakes. This exhausts the third pneumatic conduit section 128, causing the wheel valve 140 to close and isolate tire and wheel assembly 60.

The second pneumatic conduit section 120 is fluidly connected to the solenoid valve 204i. The second pneumatic conduit section 120 includes a check valve 122. The operation of the solenoid valve 204i is controlled by an electronic control unit (ECU) 302i. A sensor 300i generates a signal that is indicative of load of the heavy-duty vehicle from systems such as the air spring 24, a ride height control valve, an axle lift control sensor or the like. The sensor 300i communicates the signal to the electronic control unit (ECU) 302i. The ECU 302i controls the opening and closing of the solenoid valve 204i to establish pressure in the tire and wheel assembly 60. The solenoid valve 204i directs fluid flow to the tire and wheel assembly 60 from a servo valve or electronic regulator 312i or the source of fluid pressure 22. The electronic regulator 312i is arranged in parallel with the second pneumatic conduit section 120. ECU 302i signals the solenoid valve 204i to direct fluid flow to and from electronic regulator 312i to the tire and wheel assembly 60. ECU 302i continually monitors pressure in response to a condition determined by the sensor 300i. When ECU 302i detects a change in, for example, air spring pressure which indicates a change in load, ECU 302i will command electronic regulator 312i to increase or decrease pressure in the tire and wheel assembly 60 in a manner that corresponds to the load. Alternatively, electronic regulator 312i may be an electro-pneumatic transducer operated directly by sensor 300i. As such, solenoid valve 204i could be operated by the status of vehicle power, eliminating the need for ECU 302i and simplifying the control system.

The load-based tire inflation system 20i includes a pressure transducer 306 in fluid communication with the tire and wheel assembly 60. The pressure transducer 306 constantly monitors pressure of the tire and wheel assembly 60 through conduit 128. The pressure transducer 306 generates an electrical signal that is indicative of pressure in the tire and wheel assembly 60 to the ECU 302i. The load-based tire inflation system 20i includes a pressure transducer 304 in fluid communication with fluid pressure source 22. The pressure transducer 304 constantly monitors the pressure of fluid pressure source 22 through conduit 100. The pressure transducer 304 generates an electrical signal that is indicative of pressure in the fluid pressure source and transmits it to the ECU 302i. The ECU 302i uses the signal from the pressure transducers 304, 306 as input parameters used to control the condition of the electronic regulator 312i.

The ECU 302i may be any suitable electronic control unit. For example, the ECU 302i could be an electronic control unit dedicated to the control system 46i of the load-based tire inflation system 20i. The ECU 302i could be an electronic control unit that is shared with an anti-lock braking system (ABS) of the heavy-duty vehicle.

The control system 46i may include an indicator light 314i that is in communication with the ECU. The indicator light 314i may be located anywhere on the heavy-duty vehicle or optionally in a cab of the tractor or truck that is operatively attached to the heavy-duty vehicle. The indicator light 314i may be used to alert a driver or service technician that something in the load-based tire inflation system 20i needs attention, servicing, or that a fault has occurred.

The load-based tire inflation system 20i may be a constant-pressure system that does not exhaust air to atmosphere unless the heavy-duty vehicle load has been reduced and the tire inflation system responds by reducing tire pressure and the tire isolation system 126 is energized, or there is a system issue. It is to be appreciated that such a constant pressure system retains at least some amount of pressure in at least conduit 128, and may not hold the same amount or level of pressure all of the time. As a result, the load-based tire inflation system 20i continuously monitors tire pressure and dynamically responds to changes in the signal from sensor 300i, which is indicative of changes in load of the heavy-duty vehicle, thereby providing an active and quick response to the tire and wheel assembly 60.

The load-based tire inflation system 20i, thus, includes a way to monitor the load carried by a heavy-duty vehicle and automatically and continuously adjust the pneumatic pressure in the tire and wheel assembly 60 based on the load in the heavy-duty vehicle. The way of continuously monitoring the load of the heavy-duty vehicle that corresponds to the vehicle load includes the sensor 300i associated with a ride height control valve, an axle lift control sensor or the like that electronically communicates to the ECU 302i. The solenoid valve 204i responds to a signal from the ECU 302i, and enables air to flow from source of fluid pressure 22 or the electronic regulator 312*i* to the tire and wheel assembly 60 in a manner that is proportional to the load of the heavy-duty vehicle. If vehicle electrical power is lost, solenoid valve 204*i* defaults to the maximum threshold regulator 200*i*. ECU 302*i* can also de-energize solenoid valve 204*i* in the event of an air spring, pressure sensor, or other component failure, defaulting to the maximum threshold regulator 200*i*.

Other features of a load-based tire inflation system could be incorporated to any of the aspects described above. For example, in aspects employing an ECU, control of the pressure in the tire and wheel assemblies may be based on an algorithm. Vehicle load may be determined from a pressure transducer or load cell attached to the suspension. The ECU could control a servo valve, stepper valve, or pulse regulator to inflate the tire and wheel assemblies to a pressure that corresponds to a table, formula or algorithm that relates tire pressure to air spring pressure for a given load. The servo or stepper valve would be designed to go to a normally closed state when electric power was not present. There are a number of conditions that can be detected with an ECU. The ECU could indicate low tire pressure, low supply pressure, current tire pressure, whether the system was inflating or deflating, vehicle load, etc.

Further, a 3-way solenoid valve, which is energized during normal operation, may move to the de-energized state and deliver pressure to the tires through a secondary manual regulator. A pressure transducer or pressure switch, that may be located in the conduit coming from the source of fluid pressure 22, could be used to determine if there was adequate supply pressure to inflate tires to a specific value determined by the ECU. A manual regulator may be set to a tire pressure for a loaded vehicle. This prevents an under-inflation condition for the vehicle if the vehicle has no electric power.

Any of the load-based tire inflation systems 20*a*-20*i* may also include an alternative control system and/or structure that allows the tire and wheel assembly 60 to be connected directly to the air spring 24 and be exposed to, and operate from, the same air pressure. For example, the air spring 24 may be modified or designed to operate on the same or similar pressure as a function of load parameters as a particular configuration of the tire and wheel assembly 60 on the heavy-duty vehicle. Likewise, the tire and wheel assembly 60 may be modified or designed to operate on the same or similar pressure in response to load parameters as a particular air spring 24.

The disclosed subject matter successfully incorporates a load-based tire inflation system into a heavy-duty vehicle that improves performance characteristics and properties of tire and wheel assemblies, increases fuel economy, decreases heavy-duty vehicle downtime and operational cost, and improves tire life and the durability that is required in the transportation industry. It is to be understood that the disclosed subject matter finds application in all types of tire inflation systems and air springs and suspension systems without affecting the concept or implementation of the disclosed subject matter. Accordingly, the improved load-based tire inflation system is relatively simple, provides an effective and efficient structure which overcome disadvantages of the prior art.

It is to be understood that the structure and operation of the load-based tire inflation system may be altered or rearranged, or certain components omitted or added, without affecting the overall concept or operation of the disclosed subject matter. It is also to be understood that the disclosed concept finds application in all types of tire inflation systems, including other types of tire inflation systems than those shown and described herein, without affecting the concept or operation. While reference is made generally to a heavy-duty vehicle for the purpose of convenience, it has been with the understanding that such reference includes trucks, tractor-trailers or semi-trailers, and trailers thereof. The disclosed concept has been described with reference to specific aspects. It is understood that this description and illustration is by way of example and not by way of limitation. It should also be understood that the boost source of pressurized air 56, while only shown in FIG. 3, may also be employed with any of the systems or aspects shown and described in the disclosed subject matter.

In the foregoing description, certain terms have been used for brevity, clarity and understanding, but no unnecessary limitations are to be implied therefrom beyond the requirements of the prior art, because such terms are used for descriptive purposes and are intended to be broadly construed. Moreover, the disclosed subject matter has been described and illustrated with reference to at least one specific aspect. It is understood that this description and illustration is by way of example and not limitation. Potential modifications and alterations will occur to others upon a reading and understanding of the disclosed subject matter, and it is understood that the disclosed subject matter includes all such modifications, alterations and equivalents.

Having now described the features, discoveries and principles of the disclosed subject matter, the manner in which the load-based tire inflation system is used and installed, the characteristics of the construction, arrangement and method steps, and the advantageous, new and useful results obtained; the new and useful structures, devices, elements, arrangements, process, parts and combinations are set forth in the appended claims.

What is claimed is:

1. A load-based tire inflation system for a heavy-duty vehicle comprising:
   at least one source of fluid pressure;
   a suspension structure of the heavy-duty vehicle, the suspension structure having a condition indicative of a load of the heavy-duty vehicle;
   a tire and wheel assembly operatively mounted to an axle of the heavy-duty vehicle and in fluid communication with the at least one source of fluid pressure; and
   means for controlling fluid pressure in the tire and wheel assembly in response to the condition of the suspension structure, said controlling means providing fluid flow to and maintaining the tire and wheel assembly at a pre-selected fluid pressure in the absence of electrical power.

2. The load-based tire inflation system of claim 1 further including a first sensor to detect the condition of the suspension structure and a second sensor to detect a fluid pressure in the tire and wheel assembly, wherein the system to control fluid pressure operates in response to signals communicated from the first and second sensors.

3. The load-based tire inflation system of claim 1 further including the suspension structure having at least one member selected from the group consisting of a ride height control valve, a lift air bag, and an air spring.

4. The load-based tire inflation system of claim 3 where the suspension structure of the heavy-duty vehicle is in communication with the at least one source of fluid pressure.

5. The load-based tire inflation system of claim 1 where the condition of the suspension structure is a fluid pressure within said suspension structure.

6. The load-based tire inflation system of claim 1, said means comprising a regulator, said regulator maintaining the tire and wheel assembly at a minimum pressure threshold.

7. The load-based tire inflation system of claim 1 wherein the at least one source of fluid pressure is maintained at a constant pressure, the at least one source of fluid pressure being a conduit in selective fluid communication with the tire and wheel assembly.

8. The load-based tire inflation system of claim 1 wherein the means for controlling fluid pressure in the tire and wheel assembly includes an electronic control unit.

9. The load-based tire inflation system of claim 1, wherein said means for controlling fluid pressure in said tire and wheel assembly adjusts fluid pressure in the tire and wheel assembly relative to a pressure differential between said suspension structure and said tire and wheel assembly.

10. The load-based tire inflation system of claim 9 wherein the means for controlling fluid pressure in the tire and wheel assembly further comprises a pressure switch.

11. A load-based tire inflation system for a heavy-duty vehicle comprising:
   at least one source of fluid pressure;
   a suspension structure of the heavy-duty vehicle, the suspension structure having a condition indicative of a load of the heavy-duty vehicle;
   a tire and wheel assembly operatively mounted to an axle of the heavy-duty vehicle and in fluid communication with the at least one source of fluid pressure; and
   means for controlling fluid pressure in the tire and wheel assembly in response to the condition of the suspension structure, said means providing fluid flow to the tire and wheel assembly and being free of any electrically-powered components.

12. The load-based tire inflation system of claim 11, said suspension structure comprising at least one chosen from the group consisting of a lift air bag and an air spring.

13. The load-based tire inflation system of claim 11, said suspension structure being in fluid communication with said means for controlling fluid pressure in the tire and wheel assembly.

14. The load-based tire inflation system of claim 11, said condition of said suspension structure being a fluid pressure within the suspension structure.

15. The load-based tire inflation system of claim 11, said means for controlling fluid pressure in the tire and wheel assembly comprising at least one regulator.

16. A load-based tire inflation system for a heavy-duty vehicle comprising:
   at least one source of fluid pressure;
   a suspension structure of the heavy-duty vehicle, the suspension structure having a condition indicative of a load of the heavy-duty vehicle;
   a tire and wheel assembly operatively mounted to an axle of the heavy-duty vehicle and in fluid communication with the at least one source of fluid pressure; and
   means for controlling fluid pressure in the tire and wheel assembly in response to the condition of the suspension structure, said means providing fluid flow to the tire and wheel assembly, said suspension structure being in fluid communication with only non-electronic components of the controlling means.

17. The load-based tire inflation system of claim 16, said condition of said suspension structure being a fluid pressure within the suspension structure.

18. The load-based tire inflation system of claim 17, wherein said fluid pressure within said suspension structure operates said non-electronic component of said controlling means.

19. The load-based tire inflation system of claim 16, said controlling means comprising at least one regulator.

* * * * *